United States Patent
Cho et al.

(10) Patent No.: US 12,287,110 B2
(45) Date of Patent: Apr. 29, 2025

(54) AIR CONDITIONER HAVING SIX PORTS

(71) Applicants: Korea Institute of Civil Engineering and Building Technology, Goyang (KR); Omnivent Corporation, Seoul (KR)

(72) Inventors: Dongwoo Cho, Seongnam (KR); Changu Chae, Paju (KR); Kyungjoo Cho, Incheon (KR); Kwangsu Kim, Uiwang (KR)

(73) Assignees: Korea Institute of Civil Engineering and Building Technology, Goyang (KR); Omnivent Corporation, Seoul (KR)

( * ) Notice: Subject to any disclaimer, the term of this patent is extended or adjusted under 35 U.S.C. 154(b) by 251 days.

(21) Appl. No.: 17/925,759

(22) PCT Filed: Aug. 27, 2021

(86) PCT No.: PCT/KR2021/011501
§ 371 (c)(1),
(2) Date: Nov. 16, 2022

(87) PCT Pub. No.: WO2022/045820
PCT Pub. Date: Mar. 3, 2022

(65) Prior Publication Data
US 2023/0175726 A1    Jun. 8, 2023

(30) Foreign Application Priority Data

Aug. 27, 2020 (KR) .......................... 10-2020-0108575

(51) Int. Cl.
*F24F 12/00* (2006.01)
*F24F 1/022* (2019.01)
(Continued)

(52) U.S. Cl.
CPC ............ *F24F 12/006* (2013.01); *F24F 1/022* (2013.01); *F24F 7/08* (2013.01); *F24F 11/0001* (2013.01);
(Continued)

(58) Field of Classification Search
CPC .. F24F 12/006; F24F 7/08; F24F 1/022; F24F 13/12; F24F 13/14; F24F 2013/225
See application file for complete search history.

(56) References Cited

U.S. PATENT DOCUMENTS 10,823,437 B2 *   11/2020   Lee .................... F24F 3/1423

FOREIGN PATENT DOCUMENTS

EP          0044560 A2 *   1/1982
JP          2010-197026 A    9/2010
(Continued)

OTHER PUBLICATIONS

Translation of KR101565249B1 named Translation-KR101565249B1 (Year: 2015).*
(Continued)

*Primary Examiner* — Paul Alvare
(74) *Attorney, Agent, or Firm* — Young Basile Hanlon & MacFarlane, P.C.

(57) ABSTRACT

An air conditioner having six ports is described. The inner space of a casing having six inlet/outlets including a first discharge port, a second discharge port, a first outdoor air intake port, a second outdoor air intake port, and an interior air suction port is divided by a partition wall to form a first passage and a second passage. A waste heat recovery heat exchanger is provided between the first passage and the second passage. The air flow direction and the air volume can be controlled by using a direction change damper, a first air volume control damper, and a second air volume control damper.

21 Claims, 21 Drawing Sheets

(51) Int. Cl.
  *F24F 7/08* (2006.01)
  *F24F 11/00* (2018.01)
  *F24F 13/12* (2006.01)
  *F24F 13/14* (2006.01)
  *F24F 13/20* (2006.01)
  *F24F 13/22* (2006.01)
  *F24F 13/28* (2006.01)
(52) U.S. Cl.
  CPC .............. *F24F 13/12* (2013.01); *F24F 13/14* (2013.01); *F24F 13/20* (2013.01); *F24F 13/28* (2013.01); *F24F 2013/205* (2013.01); *F24F 2013/225* (2013.01); *F24F 2221/16* (2013.01)

(56) References Cited

FOREIGN PATENT DOCUMENTS

| | | | | |
|---|---|---|---|---|
| JP | 5218135 | B2 | * | 6/2013 |
| KR | 20060026759 | A | * | 3/2006 |
| KR | 10-2006-0100337 | A | | 9/2006 |
| KR | 20060100337 | A | * | 9/2006 |
| KR | 20100019677 | A | * | 2/2010 |
| KR | 101263656 | B1 | * | 5/2013 |
| KR | 101490425 | B1 | * | 2/2015 |
| KR | 101565249 | B1 | * | 11/2015 |
| KR | 101680095 | B1 | * | 11/2016 |
| KR | 20-2019-0001916 | U | | 7/2019 |
| KR | 102232441 | B1 | | 3/2021 |
| KR | 102254003 | B1 | * | 5/2021 |
| WO | WO-2018221740 | A1 | * | 12/2018 ............. B01D 53/22 |

OTHER PUBLICATIONS

Translation of KR20060100337A named Translation-KR20060100337A (Year: 2006).*

* cited by examiner

AIR CONDITIONER HAVING SIX PORTS

TECHNICAL FIELD

The present disclosure relates to an air conditioner having six ports for controlling an indoor air environment.

BACKGROUND

Due to the characteristics of the climate of Korea, the temperature and humidity are low in winter, while the temperature and humidity are gradually increasing in summer. Days with a high concentration of fine dust are increasing.

Considering that most of the activities of modern people are indoors, the importance of indoor air quality is increasing. To this end, there is an increasing demand for an air conditioner capable of performing indoor temperature and humidity control, air cleaning, and ventilation.

Air conditioners used in existing residential and non-residential buildings perform cooling and heating by switching a condenser and an evaporator, but the indoor air environment is deteriorating due to the lack of dehumidification, humidification, and ventilation functions that allow outdoor air to flow in or out.

Recently, air conditioners capable of performing air cleaning and ventilation along with heating and cooling are being developed, but they have a problem in that the volume increases and noise is generated due to the configuration of a heating and cooling coil, a heat exchanger, an air supply fan, a discharge fan, a damper, an outdoor unit, and the like.

For example, in a conventional air conditioner, during indoor cooling, refrigerant is discharged from a compressor, flows into an evaporator through a condenser and an expansion valve, and absorbs heat from air flowing into a room while passing through the evaporator, and the air, which has been deprived of heat in the evaporator, flows into the room to cool the room. Conversely, during indoor heating, the refrigerant flows into the condenser after being discharged from the compressor, and transfers heat to the air flowing into the room while passing through the condenser. Accordingly, when the air, which has absorbed heat in the condenser, flows into the room, the room is heated. In addition, during indoor heating, a cooling water circulation circuit acts as a heat pump with respect to a refrigerant circulation circuit.

In addition, to perform both heating and cooling with one air conditioner, a heat pump that performs cooling and heating by converting the refrigerant flow of the refrigeration cycle in a reverse cycle depending on the season to reversely change the functions of the evaporator and the condenser is widely used. Furthermore, purifying indoor air using a ventilation unit, which discharges indoor air to the outside while supplying fresh outdoor air into a room for indoor ventilation and recovers heat energy from the indoor air discharged to the outside by installing a waste heat recovery heat exchanger between the air discharged to the outside and the air supplied to the room, is gradually increasing.

However, in the conventional air conditioner as mentioned above, the heat pump and the ventilation unit used for cooling, heating, and ventilation are installed independently as separate systems, and the outdoor unit and the air conditioner are installed indoors and outdoors, respectively, so there is a problem of occupying a lot of installation space.

In addition, the conventional air conditioner implements the humidification function by adding separate equipment in such a manner as rotary vaporization type, ultrasonic type, and heating type. Further, the conventional air conditioner requires a separate drain for discharging condensation water.

As such, the conventional air conditioner not only requires additional equipment for humidification and discharge of condensation water, but also has a problem that air may be contaminated during humidification.

SUMMARY

Embodiments of the present disclosure provide an air conditioner having six ports that is capable of efficiently performing cooling, heating, dehumidification, humidification, defrost, air cleaning, and ventilation by converting airflow in various ways with six air inlets and outlets, and also performing energy-saving operation with a compact configuration without a separate outdoor unit by implementing the above with an integrated configuration.

According to an embodiment of the present invention, an air conditioner having six ports comprises: a casing in which at one end, a first discharge port, a second discharge port, and an air supply port disposed between the first discharge port and the second discharge port are formed, and at the other end, a first outdoor air intake port, a second outdoor air intake port, and an indoor air intake port disposed between the first outdoor air intake port and the second outdoor air intake port are formed; a partition wall part dividing an inner space of the casing into a first passage one end of which faces the first discharge port and the air supply port, and the other end of which faces the first outdoor air intake port and the indoor air intake port, and a second passage one end of which faces the second discharge port and the air supply port, and the other end of which faces the second outdoor air intake port and the indoor air intake port; a direction change damper connecting the air supply port and the indoor air intake port to the first passage or the second passage; a waste heat recovery heat exchanger in which air in the first passage moving to the second passage through the partition wall part and air in the second passage moving to the first passage through the partition wall part are subject to heat exchange with each other; a first air volume control damper for controlling an opening rate of a space between the waste heat recovery heat exchanger and the casing in the first passage; and a second air volume control damper for controlling an opening rate of a space between the waste heat recovery heat exchanger and the casing in the second passage.

The direction change damper may include: an air supply direction change damper installed at the one end of the partition wall part to selectively block between the first passage and the air supply port or between the second passage and the air supply port; and an indoor air intake direction change damper installed at the other end of the partition wall part to selectively block between the first passage and the indoor air intake port or between the second passage and the indoor air intake port.

The air supply direction change damper and the indoor air intake direction change damper may be rotational dampers that rotate about the one end and the other end of the partition wall part as rotation centers, respectively.

In addition, the air supply port may be divided into a first air supply area facing the first passage and a second air supply area facing the second passage, the air supply direction change damper may slide between the first air supply area and the second air supply area of the air supply port to selectively block one of the first air supply area and the second air supply area, the indoor air intake port may be divided into a first indoor air intake area facing the first passage and a second indoor air intake area facing the second passage, and the indoor air intake direction change damper slides between the first indoor air intake area and the second indoor air intake area of the indoor air intake port to selectively block one of the first indoor air intake area and the second indoor air intake area.

Further, the air supply port may be divided into a first air supply area facing the first passage and a second air supply area facing the second passage, the indoor air intake port may be divided into a first indoor air intake area facing the first passage and a second indoor air intake area facing the second passage, the air supply direction change damper may include a first air supply direction change damper installed in the first air supply area of the air supply port, and a second air supply direction change damper installed in the second air supply area, and the indoor air intake direction change damper may include a first indoor air intake direction change damper installed in the first indoor air intake area of the indoor air intake port, and a second indoor air intake direction change damper installed in the second indoor air intake area.

The six port air conditioner may further comprise: an evaporator disposed between the first discharge port and the air supply port, and the waste heat recovery heat exchanger in the first passage; a condenser disposed between the second discharge port and the air supply port, and the waste heat recovery heat exchanger in the second passage, which exchanges refrigerant with the evaporator; a refrigerant flow path through which the refrigerant flows between the evaporator and the condenser; an expansion valve installed in the refrigerant flow path; a compressor disposed between the condenser and the waste heat recovery heat exchanger in the second passage to compress the refrigerant flowing along the refrigerant flow path; and a filter unit disposed in the air supply port.

In an example of the air conditioner, water generated in the evaporator is supplied to the condenser, the condenser evaporates the water supplied from the evaporator into water vapor through heat of condensation, and the water vapor generated in the condenser is supplied indoor in winter and discharged outdoor in summer.

The air conditioner may further comprise: a first blower disposed between the first discharge port and the air supply port, and the waste heat recovery heat exchanger in the first passage to blow air toward the first discharge port and the air supply port; a second blower disposed between the second discharge port and the air supply port, and the waste heat recovery heat exchanger in the second passage to blow air toward the second discharge port and the air supply port, a first discharge damper for controlling an air volume of air discharged through the first discharge port; a second discharge damper for controlling an air volume of air discharged through the second discharge port; a first intake damper for controlling an air volume of air sucked through the first outdoor air intake port; and a second intake damper for controlling an air volume of air sucked through the second outdoor air intake port.

The air conditioner may further comprise: an indoor air intake air volume sensor for detecting an air volume of air sucked through the indoor air intake port; a first outdoor air intake air volume sensor for detecting an air volume of air sucked through first outdoor air intake port; and a second outdoor air intake air volume sensor for detecting an air volume of air sucked through the second outdoor air intake port.

When the air conditioner operates in a summer cooling, dehumidification, and full outdoor air ventilation operation mode, the first air volume control damper may block a space between the waste heat recovery heat exchanger and the casing in the first passage, the second air volume control damper may block a space between the waste heat recovery heat exchanger and the casing in the second passage, the air supply direction change damper may block between the second passage and the air supply port, and the indoor air intake direction change damper may block between the second passage and the indoor air intake port. Thusly, the outdoor air sucked through the second outdoor air intake port is supplied into a room through the air supply port after passing through the waste heat recovery heat exchanger and the evaporator, and the indoor air sucked through the indoor air intake port is discharged to the outside through the second discharge port after passing through the waste heat recovery heat exchanger and the condenser.

When the air conditioner operates in a summer cooling, dehumidification, and partial outdoor air ventilation operation mode, the first air volume control damper may partially open a space between the waste heat recovery heat exchanger and the casing in the first passage, the second air volume control damper may partially open a space between the waste heat recovery heat exchanger and the casing in the second passage, the air supply direction change damper may block between the second passage and the air supply port, and the indoor air intake direction change damper may block between the second passage and the indoor air intake port. Thusly, some of the outdoor air sucked through the second outdoor air intake port is supplied into a room through the air supply port after passing through the waste heat recovery heat exchanger and the evaporator, the remaining of the outdoor air sucked through the second outdoor air intake port is discharged to the outside through the second discharge port after passing through the condenser, some of the indoor air sucked through the indoor air intake port is discharged to the outside through the second discharge port after passing through the waste heat recovery heat exchanger and the condenser, and the remaining of the indoor air sucked through the indoor air intake port is supplied to the room through the air supply port after passing through the evaporator.

When the air conditioner operates in a summer cooling, dehumidification, and recirculation operation mode, the first air volume control damper may completely open a space between the waste heat recovery heat exchanger and the casing in the first passage, the second air volume control damper may completely open a space between the waste heat recovery heat exchanger and the casing in the second passage, the air supply direction change damper may block between the second passage and the air supply port, and the indoor air intake direction change damper may block between the second passage and the indoor air intake port. Thusly, the outdoor air sucked through the second outdoor air intake port is discharged to the outside through the second discharge port after passing through the condenser, and the indoor air sucked through the indoor air intake port is supplied to a room through the air supply port after passing through the evaporator.

When the air conditioner operates in a winter heating, humidification, and full outdoor air ventilation operation mode, the first air volume control damper may block a space between the waste heat recovery heat exchanger and the casing in the first passage, the second air volume control damper may block a space between the waste heat recovery heat exchanger and the casing in the second passage, the air supply direction change damper may block between the first passage and the air supply port, and the indoor air intake direction change damper may block between the first passage and the indoor air intake port. Thusly, the outdoor air sucked through the first outdoor air intake port is supplied into a room through the air supply port after passing through the waste heat recovery heat exchanger and the condenser, and the indoor air sucked through the indoor air intake port is discharged to the outside through the first discharge port after passing through the waste heat recovery heat exchanger and the evaporator.

When the air conditioner operates in a winter heating, humidification, and partial outdoor air ventilation operation mode, the first air volume control damper may partially open a space between the waste heat recovery heat exchanger and the casing in the first passage, the second air volume control damper may partially open a space between the waste heat recovery heat exchanger and the casing in the second passage, the air supply direction change damper may block between the first passage and the air supply port, and the indoor air intake direction change damper may block between the first passage and the indoor air intake port. Thusly, some of the outdoor air sucked through the first outdoor air intake port is supplied into a room through the air supply port after passing through the waste heat recovery heat exchanger and the condenser, the remaining of the outdoor air sucked through the first outdoor air intake port is discharged to the outside through the first discharge port after passing through the evaporator, some of the indoor air sucked through the indoor air intake port is discharged to the outside through the first discharge port after passing through the waste heat recovery heat exchanger and the evaporator, and the remaining of the indoor air sucked into the indoor air intake port is supplied to the room through the air supply port after passing through the condenser.

When the air conditioner operates in a winter heating, humidification, and recirculation operation mode, the first air volume control damper may completely open a space between the waste heat recovery heat exchanger and the casing in the first passage, the second air volume control damper may completely open a space between the waste heat recovery heat exchanger and the casing in the second passage, the air supply direction change damper may block between the first passage and the air supply port, and the indoor air intake direction change damper may block between the first passage and the indoor air intake port. Thusly, the outdoor air sucked through the first outdoor air intake port is discharged to the outside through the first discharge port after passing through the evaporator, and the indoor air sucked through the indoor air intake port is supplied to a room through the air supply port after passing through the condenser.

When the air conditioner operates in a winter defrost operation mode, the first air volume control damper may completely open a space between the waste heat recovery heat exchanger and the casing in the first passage, the second air volume control damper may completely open a space between the waste heat recovery heat exchanger and the casing in the second passage, the air supply direction change damper may block between the first passage and the air supply port, and the indoor air intake direction change damper may block between the second passage and the indoor air intake port. Thusly, the outdoor air sucked through the second outdoor air intake port is moved to the second discharge port and the air supply port after passing through the condenser, and the indoor air sucked through the indoor air intake port is moved to the first discharge port after passing through the evaporator.

When the air conditioner operates in a changing season recirculation operation mode, the first air volume control damper may completely open the space between the waste heat recovery heat exchanger and the casing in the first passage, the second air volume control damper may block the space between the waste heat recovery heat exchanger and the casing in the second passage, the air supply direction change damper may block between the second passage and the air supply port, and the indoor air intake direction change damper may block between the second passage and the indoor air intake port. Thusly, the indoor air sucked through the indoor air intake port is supplied to a room through the air supply port.

When the air conditioner operates in a changing season ventilation operation mode, the first air volume control damper may completely open the space between the waste heat recovery heat exchanger and the casing in the first passage, the second air volume control damper may completely open the space between the waste heat recovery heat exchanger and the casing in the second passage, the air supply direction change damper may block between the first passage and the air supply port, and the indoor air intake direction change damper may block between the second passage and the indoor air intake port. Thusly, the outdoor air sucked through the second outdoor air intake port is supplied to a room through the air supply port, and the indoor air sucked through the indoor air intake port is supplied to the room through the first discharge port.

The air conditioner may further comprise: a first discharge damper that blocks the first discharge port when the air supply direction change damper blocks between the second passage and the air supply port; a second discharge damper that blocks the second discharge port when the air supply direction change damper blocks between the first passage and the air supply port; a first intake damper that blocks the first outdoor air intake port when the indoor air intake direction change damper blocks between the second passage and the air supply port; and a second intake damper that blocks the second outdoor air intake port when the indoor air intake direction change damper blocks between the first passage and the air supply port.

The air conditioner may further comprise: a first heat exchanger disposed between the first discharge port and the air supply port, and the waste heat recovery heat exchanger in the first passage; a second heat exchanger disposed between the second discharge port and the air supply port, and the waste heat recovery heat exchanger in the second passage; a refrigerant flow path through which refrigerant flows between the first heat exchanger and the second heat exchanger; an expansion valve installed in the refrigerant flow path; a compressor installed in the refrigerant flow path to compress the refrigerant; and a four-way valve for switching intake and discharge paths of the compressor.

When the air conditioner operates in a winter continuous heating operation mode, a first heating cycle in which the refrigerant discharged from the compressor flows through the four-way valve toward the second heat exchanger to allow the second heat exchanger and the first heat exchanger to respectively operate as the condenser and the evaporator, and the first air volume control damper, the second air volume control damper, and the direction change damper operate to allow the indoor air sucked through the indoor air intake port to be heated through the second heat exchanger and to be supplied into the room through the air supply port, and a second heating cycle in which the refrigerant discharged from the compressor flows through the four-way valve toward the first exchanger to allow the first heat exchanger and the second heat exchanger to respectively operate as the condenser and the evaporator. The first air volume control damper, the second air volume control damper, and the direction change damper operate to allow the indoor air sucked through the indoor air intake port to be heated through the first heat exchanger and to be supplied into the room through the air supply port, may be alternately and repeatedly operated.

The first heating cycle and the second heating cycle may be alternately repeated according to a preset cycle, or alternately repeated according to a freezing state of the first heat exchanger or the second heat exchanger.

The air conditioner may further comprise: a first condensed water collection fan for collecting condensed water generated in the first heat exchanger; a second condensed water collection fan for collecting condensed water generated in the second heat exchanger; a first condensed water spraying unit for spraying the condensed water collected in the second condensed water collecting fan to the first heat exchanger; a second condensed water spraying unit for spraying the condensed water collected in the first condensed water collecting fan to the second heat exchanger; a first condensed water pump for supplying the condensed water collected in the first condensed water collecting fan to the second condensed water spraying unit; and a second condensed water pump for supplying the condensed water collected in the second condensed water collecting fan to the first condensed water spraying unit.

In the first heating cycle, the second condensate pump may be operated to spray condensed water the first heat exchanger to be frozen on the first heat exchanger, and the condensed water frozen on the second heat exchanger is vaporized and supplied into the room together with the indoor air to increase humidity in the room. In the second heating cycle, the first condensate pump may be operated to spray condensed water to the second heat exchanger to be frozen on the second heat exchanger, and the condensed water frozen on the first heat exchanger is vaporized and supplied into the room together with the indoor air to increase humidity in the room.

According to embodiments of the present disclosure, the air conditioner having six ports can efficiently perform cooling, heating, dehumidification, humidification, defrost, air cleaning, and ventilation by converting the air flow in various ways with the six air inlets and outlets, and can also operate energy-saving with a compact configuration without a separate outdoor unit by implementing the above an integrated configuration.

DETAILED DESCRIPTION

Figure 1:
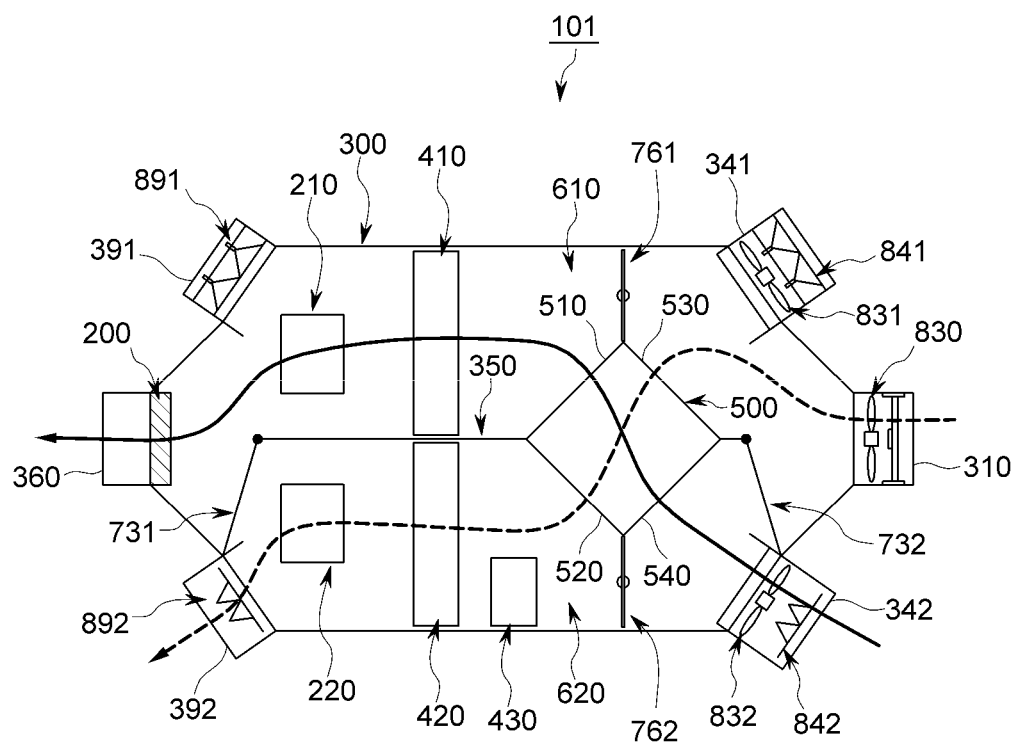
FIG. 1 is a block diagram of a six port air conditioner according to a first embodiment of the present invention.

The present disclosure is the result of an Artificial Intelligence-based (AI-based) smart housing platform and service technology development research project supervised by Korea Institute of Construction Technology and conducted by 13 organizations including Omnivent Corporation as an AI-based smart housing technology development research project supported by the Ministry of Land, Infrastructure and Transport of Korea and managed by Korea Agency for Infrastructure Technology Advancement.

Hereinafter, with reference to the accompanying drawings, embodiments of the present invention will be described in detail so that those of ordinary skill in the art to which the present invention pertains can easily implement them. The present invention may be embodied in many different forms and is not limited to the embodiments described herein.

In addition, in various embodiments, components having the same configuration are typically described in a first embodiment using the same reference numerals, and in other embodiments, only different configurations from those of the first embodiment will be described.

It is noted that the drawings are schematic and not drawn to scale. Relative dimensions and proportions of parts in the drawings are shown exaggerated or reduced in size for clarity and convenience in the drawings, and any dimensions are illustrative only and not limiting. Further, the same reference numeral is given to the same structure, element, or part appearing in two or more drawings to denote like features.

The embodiments of the present disclosure specifically represent ideal embodiments of the present invention. As a result, various modifications of the diagrams are expected. Accordingly, an embodiment is not limited to a specific shape of the illustrated area, and includes, for example, a shape modification by manufacturing.

Hereinafter, a six port air conditioner 101 according to a first embodiment of the present invention will be described with reference to FIGS. 1 to 15. The air conditioner having six ports includes six air inlets and outlets to efficiently perform cooling, heating, dehumidification, humidification, defrost, air cleaning, and ventilation by converting air flow in various ways.

Figure 2:
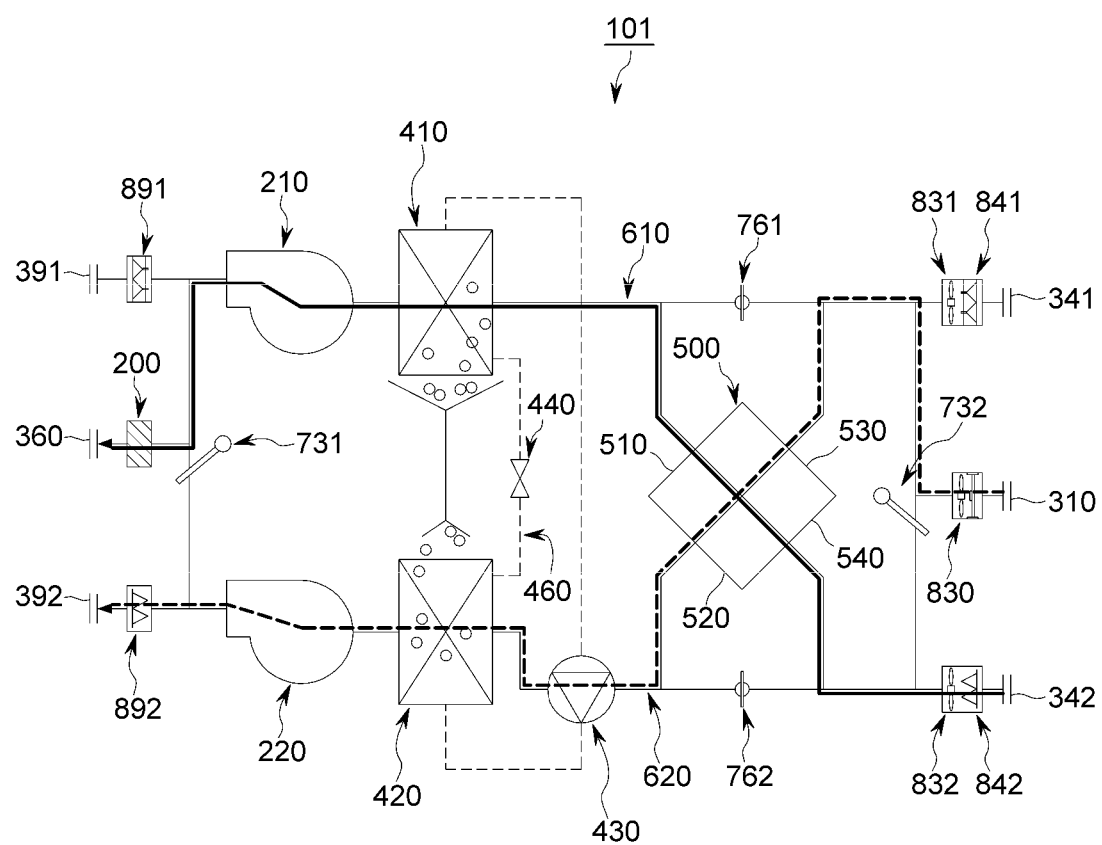
FIG. 2 is a system circuit diagram of the six port air conditioner according to the first embodiment of the present invention.

As shown in FIGS. 1 and 2, the six port air conditioner 101 according to the first embodiment of the present invention includes a casing 300, a partition wall part 350, direction change dampers 731, 732, a waste heat recovery heat exchanger 500, a first air volume control damper 761, and a second air volume control damper 762.

In addition, the six port air conditioner according to the first embodiment of the present invention may further include an evaporator 410, a condenser 420, a filter unit 200, a refrigerant flow path 460, an expansion valve 440, a compressor 430, a first blower 210, a second blower 220, a first discharge damper 891, a second discharge damper 892, a first intake damper 841, a second intake damper 842, an indoor air intake air volume sensor 830, a first outdoor air intake air volume sensor 831, and a second outdoor air intake air volume sensor 832.

The casing 300 includes six inlets and outlets. Specifically, the casing 300 includes a first discharge port 39, a second discharge port 392, an air supply port 360, a first outdoor air intake port 341, a second outdoor air intake port 342, and an indoor air intake port 310.

The first discharge port 391, the second discharge port 392, and the air supply port 360 are formed at one end of the casing 300. In this case, the air supply port 360 may be formed between the first discharge port 391 and the second discharge port 392. In addition, the first discharge port 391 is disposed to face a first passage 610 to be described later, the second discharge port 392 is disposed to face a second passage 620 to be described later, and the air supply port 360 may be formed across the first passage 610 and the second passage 620.

The first outdoor air intake port 341, the second outdoor air intake port 342, and the indoor air intake port 310 are formed at the other end of the casing 300. In this case, the indoor air intake port 310 may be formed between the first outdoor air intake port 341 and the second outdoor air intake port 342. In addition, the first outdoor air intake port 341 is disposed to face the first passage 610 to be described later, the second outdoor air intake port 342 is disposed to face the second passage 620 to be described later, and the indoor air intake port 310 may be formed across the first passage 610 and the second passage 620.

Further, as an example, the casing 300 may be made of a galvanized steel sheet. The casing 300 may be manufactured to insulate the inside to suppress occurrence of dew condensation and to allow internal and external air leakage rates to be 3% or less.

The partition wall part 350 divides the inner space of the casing 300 into the first passage 610 and the second passage 620. Specifically, the partition wall part 350 divides the inner space of the casing 300 into the first passage 610, one end of which faces the first discharge port 391 and the air supply port 360 and the other end of which faces the first outdoor air intake port 341 and the indoor air intake port 310, and the second passage 620, one end of which faces the second discharge port 392 and the air supply port 360 and the other end of which faces the second outdoor air intake port 342 and the indoor air intake port 310.

The direction change dampers 731, 732 connect the air supply port 360 and the indoor air intake port 310 to the first passage 610 or the second passage 620. Specifically, the direction change dampers 731, 732 may include a supply air direction change damper 731 installed at one end of the partition wall part 350 and an indoor air intake direction change damper 732 installed at the other end of the partition wall part 350, which serves as a bulkhead.

The air supply direction change damper 731 may selectively block between the first passage 610 and the air supply port 360 or block between the second passage 620 and the air supply port 360. Further, the indoor air intake direction change damper 732 may selectively block between the first passage 610 and the indoor air intake port 310 or block between the second passage 620 and the indoor air intake port 310.

In addition, each of the air supply direction change damper 731 and the indoor air intake direction change damper 732 is of a single blade type that can selectively close one of the first passage 610 and the second passage 620 while a single blade rotates about a rotational axis. For example, the air supply direction change damper 731 and the indoor air intake direction change damper 732 may selectively open and close the first passage 610 and the second passage 620 while swinging with points connected to one end and the other end of the partition wall part 350 as rotational axes, respectively. That is, in the first embodiment of the present invention, the air supply direction change damper 731 and the indoor air intake direction change damper 732 may be rotary dampers that rotate about one end and the other end of the partition wall part 350 as rotation centers, respectively.

The waste heat recovery heat exchanger 500 allows the air of the first passage 610 and the air in the second passage 620 to move to the second passage 620 and the first passage 610, respectively, through the partition wall part 350 while exchanging heat with each other. That is, through the waste heat recovery heat exchanger 500, the air moving from the first passage 610 to the second passage 620 and the air moving from the second passage 620 to the first passage 610 exchange heat with each other.

Specifically, the waste heat recovery heat exchanger 500 has four sides through which air flows in and out. Of the four sides of the waste heat recovery heat exchanger 500, a first side 510 faces the first passage 610, a second side 520 faces the second passage 620, a third side 530 faces the first passage 610, and a fourth side 540 faces the second passage 620. In this case, the first side 510 is disposed relatively closer to the first discharge port 391 than the third side 530, and the third side 530 is disposed relatively closer to the first outdoor air intake port 341 than the first side 510. In addition, the second side 520 is disposed relatively closer to the second discharge port 392 than the fourth side 540, and the fourth side 540 is disposed relatively closer to the second outdoor air intake port 342 than the second side 520.

The first side 510 is connected to the third side 530, and the second side 520 is connected to the fourth side 540. Accordingly, heat exchange occurs when air passing through the third side 530 and the first side 510 and air passing through the fourth side 540 and the second side 520 cross each other inside the waste heat recovery heat exchanger 500.

Further, the waste heat recovery heat exchanger 500 has a relatively high air resistance inside the casing 300. Accordingly, when the first air volume control damper 761 and the second air volume control damper 760 to be described later are completely opened, air does not pass well through the waste heat recovery heat exchanger 500 due to resistance.

For example, the waste heat recovery heat exchanger 500 may be made of plastic or metal and may have a heat exchange rate of about 85% by washing.

The first air volume control damper 761 may adjust an opening rate of a space between the waste heat recovery heat exchanger 500 and the casing 300 in the first passage 610 to control an air volume ratio of the air directed to the air supply port 360 or the first discharge port 391 and the air directed to the waste heat recovery heat exchanger 500. Accordingly, when the first air volume control damper 761 is closed, the air moves to the second passage 620 through the waste heat recovery heat exchanger 500, and when the first air volume control damper 761 is opened, the air moves along the first passage 610 without going to the waste heat recovery heat exchanger 500. In addition, when the first air volume control damper 761 is partially opened, some of the air moves to the second passage 620 through the waste heat recovery heat exchanger 500, and the remaining of the air moves along the first passage 610. Specifically, the first air volume control damper 761 may be positioned between the first side 510 and the third side 530 of the waste heat recovery heat exchanger 500.

The second air volume control damper 762 may control an air volume ratio of the air directed to the air supply port 360 or the second discharge port 392 and the air directed to the waste heat recovery heat exchanger 500 by adjusting an opening rate of a space between the waste heat recovery heat exchanger 500 and the casing 300 in the second passage 620. Accordingly, when the second air volume control damper 762 is closed, air moves to the first passage 610 through the waste heat recovery heat exchanger 500, and when the second air volume control damper 762 is opened, air moves along the second passage 62 without going to the waste heat recovery heat exchanger 500. In addition, when the second air volume control damper 762 is partially opened, some of the air moves to the first passage 610 through the waste heat recovery heat exchanger 500, and the remaining of the air moves along the second passage 620. Specifically, the second air volume control damper 762 may be positioned between the second side 520 and the fourth side 540 of the waste heat recovery heat exchanger 500.

Moreover, for example, the first air volume control damper 761 and the second air volume control damper 762 may be driven by a synchronous motor.

The evaporator 410 may be disposed in the first passage 610 between the first discharge port 391 and the air supply port 360, and the waste heat recovery heat exchanger 500.

The condenser 420 may be disposed in the second passage 620 between the second discharge port 392 and the air supply port 360, and the waste heat recovery heat exchanger 500. In addition, the evaporator 410 and the condenser 420 may exchange refrigerant through a refrigerant flow path 460 to be described later.

The refrigerant flow path 460 may circulate the refrigerant between the evaporator 410 and the condenser 420.

The expansion valve 440 and the compressor 430 may be installed in the refrigerant flow path 460. In this case, the compressor 430 may be disposed in the second passage 620 between the condenser 420 and the waste heat recovery heat exchanger 500. Because the compressor 430 generates heat in the process of compressing the refrigerant, the compressor 430 may be disposed at an upstream side of the condenser 420 to cool the compressor 430 with air moving toward the condenser 420. In the present specification, upstream and downstream sides are defined based on the flow of air.

As described above, in the first embodiment of the present invention, the evaporator 410, the condenser 420, the compressor 430, and the expansion valve 440 may all be installed inside the casing 300 to form a refrigeration cycle and heat pump. In other words, according to the first embodiment of the present invention, no separate outdoor unit is required.

In addition, in the first embodiment of the present invention, when the six port air conditioner 101 is used for air circulation or ventilation rather than cooling and heating, the compressor 430 may not be operated. When the compressor 430 is not operated, the refrigerant does not circulate between the evaporator 410 and the condenser 420, so that a refrigeration cycle or heat pump is not formed.

Meanwhile, condensed water is generated when air passes through the evaporator 410 while contacting the evaporator 410. In the first embodiment of the present invention, the water generated in the evaporator 410 is supplied to the condenser 420, and the condenser 420 may evaporate the water supplied from the evaporator 410 into water vapor through condensation heat. In this way, water vapor generated by evaporation of water in the condenser 420 may be supplied indoors in winter and discharged outdoors in summer. Accordingly, it is possible to obtain an indoor humidification effect in the summer season.

The first blower 210 may be disposed in the first passage 610 to blow air in the direction toward the first discharge port 391 and the air supply port 360. For example, the first blower 210 may be disposed in the first passage 610 between the first discharge port 391 and the air supply port 360, and the waste heat recovery heat exchanger 500.

The second blower 220 may be disposed in the second passage 620 to blow air in the direction toward the second discharge port 392 and the air supply port 360. For example, the second blower 220 may be disposed in the second passage 620 between the second discharge port 392 and the air supply port 360, and the waste heat recovery heat exchanger 500.

In the first embodiment of the present invention, depending on the operating conditions, the first blower 210 and the second blower 220 may be an air supply fan and a discharge fan, respectively, or vice versa.

The filter unit 200 may be disposed in the air supply port 360. That is, the filter unit 200 may filter various harmful substances contained in the air supplied to a room through the air supply port 360. The filter unit 200 is used to improve air quality of indoor air and may include various filters. For example, the filter unit 200 may include a filter capable of filtering at least one of an organic compound (VOC), ultra-fine dust (PM 2.5), and formaldehyde. In addition, the filter unit 200 may include a cleaning pre-filter, a fine dust filter, a deodorization filter, a sterilization device, and the like.

The first discharge damper 891 may adjust an air volume of air discharged through the first discharge port 391.

The second discharge damper 892 may adjust an air volume of air discharged through the second discharge port 392.

The first intake damper 841 may adjust an air volume of air sucked through the first outdoor air intake port 341.

The second intake damper 842 may adjust an air volume of air sucked through the second outdoor air intake port 342.

The first discharge damper 891 and the second discharge damper 892 may operate separately depending on the operation of the air supply direction change damper 731. In addition, the first intake damper 841 and the second intake damper 842 may operate separately depending on the operation of the indoor air intake direction change damper 732.

Specifically, the first discharge damper 891 may block the first discharge port 391 when the air supply direction change damper 731 blocks between the second passage 620 and the air supply port 360.

The second discharge damper 892 may block the second discharge port 392 when the supply air direction change damper 731 blocks between the first passage 610 and the supply port 360.

The first intake damper 841 may block the first outdoor air intake 341 when the indoor air intake direction change damper 732 blocks between the second passage 620 and the air supply port 360.

The second intake damper 842 may block the second outdoor air intake port 342 when the indoor air intake direction change damper 732 blocks between the first passage 610 and the air supply port 360.

The indoor air intake air volume sensor 830 may detect an intake air volume through the indoor air intake port 310.

The first outdoor air intake air volume sensor 831 may detect an intake air volume through the first outdoor air intake port 341.

The second outdoor air intake air volume sensor 832 may detect the intake air volume through the second outdoor air intake port 342.

In this case, the first intake damper 841 and the second intake damper 842 may adjust an opening rate depending on air volume information measured by the first outdoor air intake air volume sensor 831 and the second outdoor air intake air volume sensor 832, respectively. For example, when target air volumes of the first intake damper 841 and the second intake damper 842 are respectively set, it is possible to control the intake air volumes through the first outdoor air intake port 341 and the second outdoor air intake port 342 to the target air volumes by feedback controlling the air volumes measured by the first outdoor air intake air volume sensor 831 and the second outdoor air intake air volume sensor 832 to follow the target air volumes, respectively.

Hereinafter, the operating principle of the six port air conditioner 101 according to the first embodiment of the present invention will be described in detail with reference to FIGS. 1 to 15.

The six port air conditioner 101 according to the first embodiment of the present invention may, for example, separately operate in at least one operation mode selected from a summer cooling, dehumidification, ventilation, and full outdoor air operation mode, a summer cooling, dehumidification, ventilation, and partial outdoor air operation mode, a summer cooling, dehumidification, and recirculation operation mode, a winter heating, humidification, ventilation, and full outdoor air operation mode, a winter heating, humidification, ventilation, and partial outdoor operation mode, a winter heating, humidification, and recirculation operation mode, a winter defrosting operation mode, a changing season recirculation operation mode, and a changing season ventilation operation mode.

However, the operation of the six port air conditioner 101 according to the first embodiment of the present invention is not limited to the above-described operation modes. For example, in summer and winter, the six port air conditioner 101 may perform only ventilation without heating and cooling. That is, the changing season recirculation operation mode and the changing season ventilation operation mode are not necessarily performed only in the changing seasons. They may be performed in summer and winter as necessary.

The names of summer, winter, and changing season described in the present specification are only for making it easier to understand the operating state of the operation mode, and the operation mode of the six port air conditioner 101 according to the first embodiment of the present invention can be freely selected or changed by a user or a control device to be described later if necessary, and each operation mode is not limited to each season.

In addition, although not shown, the six port air conditioner 101 may further include a control device for controlling the operations of the first air volume control damper 761, the second air volume control damper 762, the air supply direction change damper 731, the indoor air intake direction change damper 732, and the first blower 210, the second blower 220, the compressor 430, the first intake damper 841, the second intake damper 842, the first discharge damper 891, the second discharge damper 892, and the like, and acquiring information from the indoor air intake air volume sensor 830, the first outdoor air intake air volume sensor 831, and the second outdoor air intake air volume sensor 832. The control device may control each damper by acquiring information from each of the sensors according to a user's command or previously inputted control logic.

As shown in FIGS. 1 and 2, when the six port air conditioner 101 operates in the summer cooling, dehumidification, and full outdoor ventilation mode, the first air volume control damper 761 may block the space between the waste heat recovery heat exchanger 500 and the casing 300 in the first passage 610, the second air volume control damper 762 may block the space between the waste heat recovery heat exchanger 500 and the casing 300 in the second passage 620, the air supply direction change damper 731 may block the space between the second passage 620 and the air supply port 360, and the air supply direction change damper 732 may block the space between the second passage 620 and the indoor air intake port 310. In this case, the first discharge damper 891 may block the first discharge port 391, and the first intake damper 841 may block the first outdoor air intake port 341.

Accordingly, the outdoor air sucked through the second outdoor air intake port 342 is blocked by the indoor air intake direction change damper 732 and the second air volume control damper 762. The outdoor air thus passes through the waste heat recovery heat exchanger 500, moves to the first passage 610, and then passes through the evaporator 410 to be supplied into a room through the air supply port 360. The indoor air sucked though the indoor air intake port 310 is blocked by the indoor air intake direction change damper 732 and the first air volume control damper 761. The indoor air thus passes through the waste heat recovery heat exchanger 500 to move to the second passage 620, and then passes through the condenser 420 to be discharged to the outside through the second discharge port 392. In this case, the evaporator 410 and the condenser 420 constitute a refrigeration cycle.

In this way, because the outdoor air moves into the room through the evaporator 410, the room can be cooled. In addition, because the outdoor air exchanges heat with the indoor air in the waste heat recovery heat exchanger 500 before going to the evaporator 410, thermal efficiency can be increased.

Further, by cooling the condenser with the indoor air that has passed through the waste heat recovery heat exchanger 500, it is possible to improve the cooling efficiency of the refrigeration cycle.

In addition, because the outdoor air sucked through the second outdoor air intake port 342 is supplied to the room, the air volume measured by the second outdoor air intake air volume sensor 832 installed in the second outdoor air intake port 342 may be a ventilation air volume.

Furthermore, as shown in FIG. 2, condensed water is generated in the evaporator 410 while relatively hot air passes through the relatively cold evaporator 410 in summer.

In the first embodiment of the present invention, because the evaporator 410 and the condenser 420 constitute a refrigeration cycle in the summer cooling, dehumidification, and partial outdoor ventilation operation mode, the temperature of the condenser 420 can be lowered by outdoor air. The temperature of the condenser 420 can be more effectively lowered by the latent heat of evaporation when water generated in the evaporator 410 and supplied to the condenser 420 is evaporated, thereby greatly improving the efficiency of the refrigeration cycle.

As described above, the operation of supplying the condensed water generated in the evaporator 410 to the condenser 420, and evaporating it in the condenser 420 and lowering the temperature of the condenser 420 using the latent heat of evaporation at this time may be applied not only to the summer cooling, dehumidification, and full outdoor air ventilation operation mode, but also to the summer cooling, dehumidification, and partial outdoor air ventilation operation mode and the summer cooling, dehumidification, and recirculation operation mode, which are described later.

In addition, FIG. 2 shows a structure in which the condenser 420 is positioned below the evaporator 410, and water generated in the evaporator 410 is directed to the condenser 420 by gravity.

However, the first embodiment of the present invention is not limited to the above, and the evaporator 410 and the condenser 420 are disposed side by side, and water generated from the evaporator 410 may be supplied to the condenser 420 using a water pump (not shown). In this case, the water generated by the evaporator 410 may be supplied directly to the condenser 420 by the water pump but may be stored in a separate storage tank (not shown). Then, the water stored in the storage tank may be supplied to the condenser 420 by using the water pump.

Figure 3:
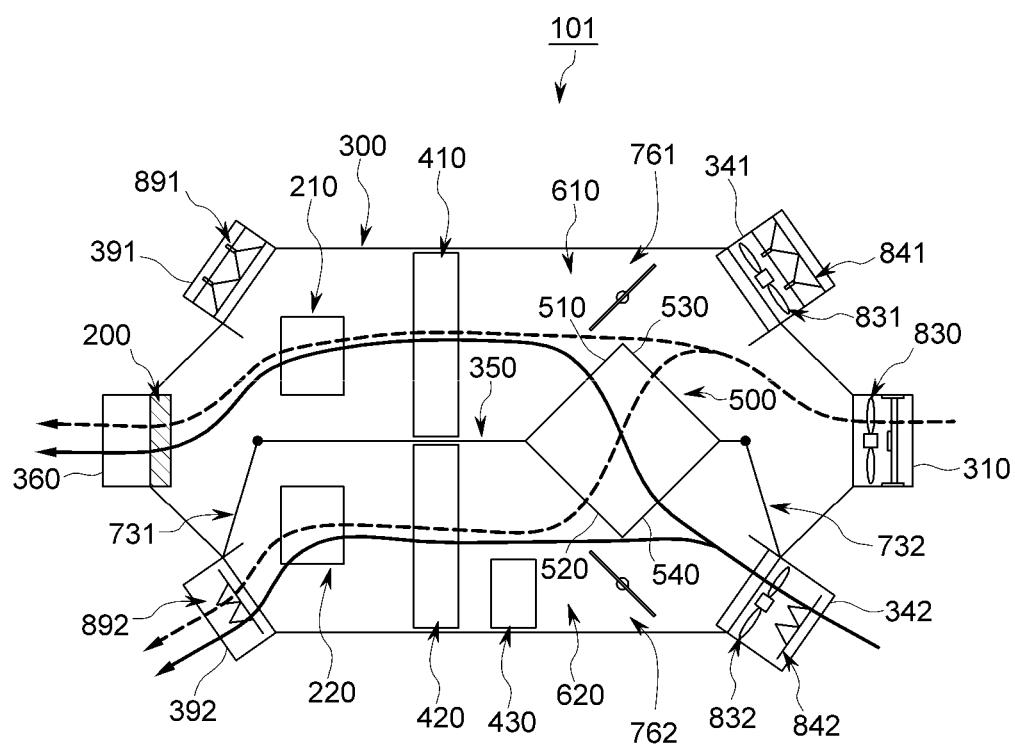
FIGS. 3, 5, 7, 9, 11, and 13 to 15 are configuration diagrams for respective operating states of the six port air conditioner according to the first embodiment of the present invention.
Figure 4:
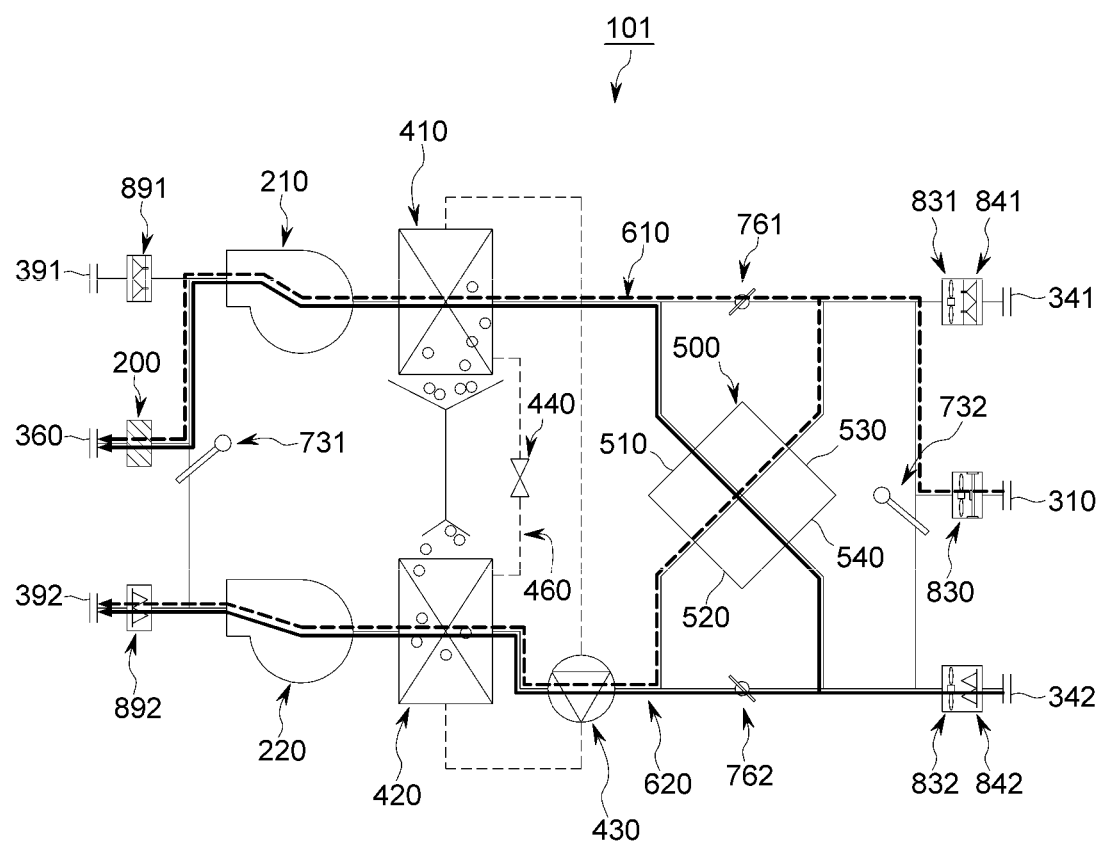
FIGS. 4, 6, 8, 10, and 12 are system circuit diagrams for respective operating states of the six port air conditioner according to the first embodiment of the present invention.

As shown in FIGS. 3 and 4, when the six port air conditioner 101 operates in the summer cooling, dehumidification, and partial outdoor air ventilation operation mode, the first air volume control damper 761 may partially open the space between the waste heat recovery heat exchanger 500 and the casing 300 in the first passage 610, the second air volume control damper 762 may partially open the space between the waste heat recovery heat exchanger 500 and the casing 300 in the second passage 620, the air supply direction change damper 731 may block the space between the second passage 620 and the air supply port 360, and the indoor air intake direction change damper 732 may block the space between the second passage 620 and the indoor air intake port 310. In this case, the first discharge damper 891 may block the first discharge port 391, and the first intake damper 841 may block the first outdoor air intake port 341.

Accordingly, some of the outdoor air sucked through the second outdoor air intake port 342 may pass through the waste heat recovery heat exchanger 500 to move to the first passage 610 and then pass through the evaporator 410 to be supplied into the room through the air supply port 360. The remaining of the outdoor air sucked through the second outdoor air intake port 342 may move along the second passage 620 and pass through the condenser 420 to be discharged to the outside through the second discharge port 392. Some of the indoor air sucked through the indoor air intake port 310 may pass through the waste heat recovery heat exchanger 500 to move to the second passage 620 and then pass through the condenser 420 to be discharged to the outside through the second discharge port 392. The remaining of the indoor air sucked through the indoor air intake port 310 may move along the first passage 610 and pass through the evaporator 410 to be supplied into the room through the air supply port 360.

In this way, because the outdoor air moves into the room through the evaporator 410, the room can be cooled. In addition, because the outdoor air exchanges heat with the indoor air in the waste heat recovery heat exchanger 500 before going to the evaporator 410, thermal efficiency can be increased.

Further, some of the outdoor air is discharged back to the outside without passing through the waste heat recovery heat exchanger 500, and some of the indoor air is supplied back to the room without passing through the waste heat recovery heat exchanger 500. Accordingly, it is possible to reduce heat loss due to ventilation and improve cooling performance although the ventilation air volume is reduced.

In addition, in the summer cooling, dehumidification, and partial outdoor air ventilation operation mode, by measuring the temperature and air volume of the indoor air sucked through the indoor air inlet port 310 and the temperature and air volume of the outdoor air sucked through the second outdoor air intake port 342, and then comparing them with the temperature and air volume of the mixed air of the indoor air that has passed through the waste heat recovery heat exchanger 500 after being sucked through the indoor air intake port 310 and the outdoor air that has passed through the second air volume control damper 762 without passing through the waste heat recovery heat exchanger 500, it is possible to estimate the air volume of outdoor air supplied into the room, that is, the ventilation air volume.

Figure 5:
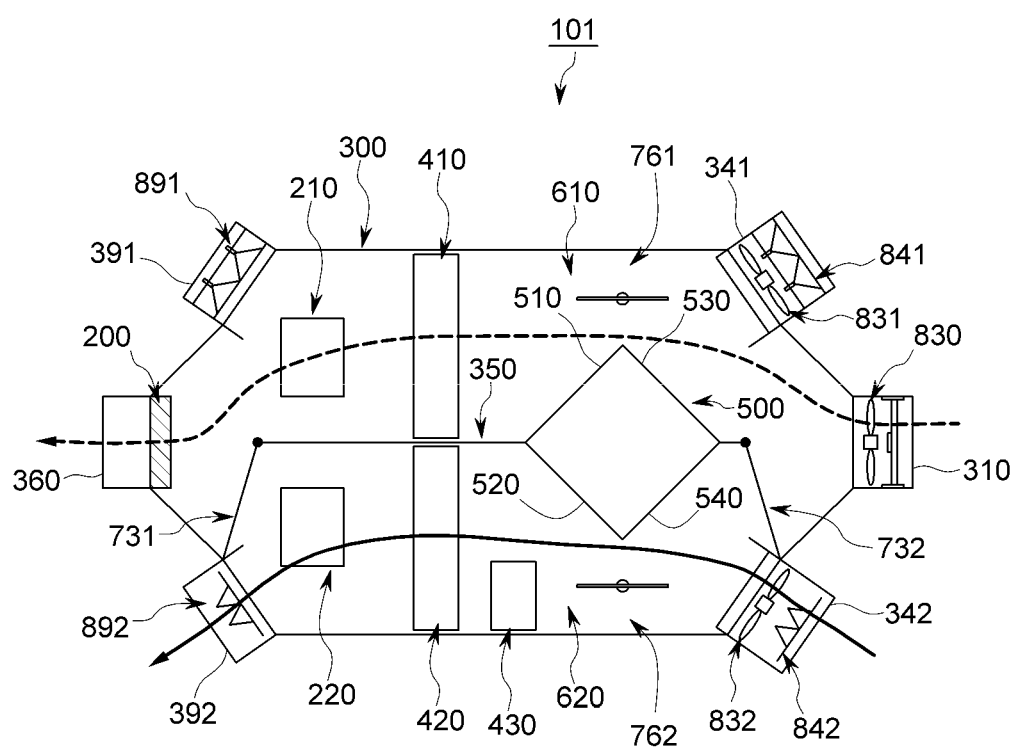
Figure 6:
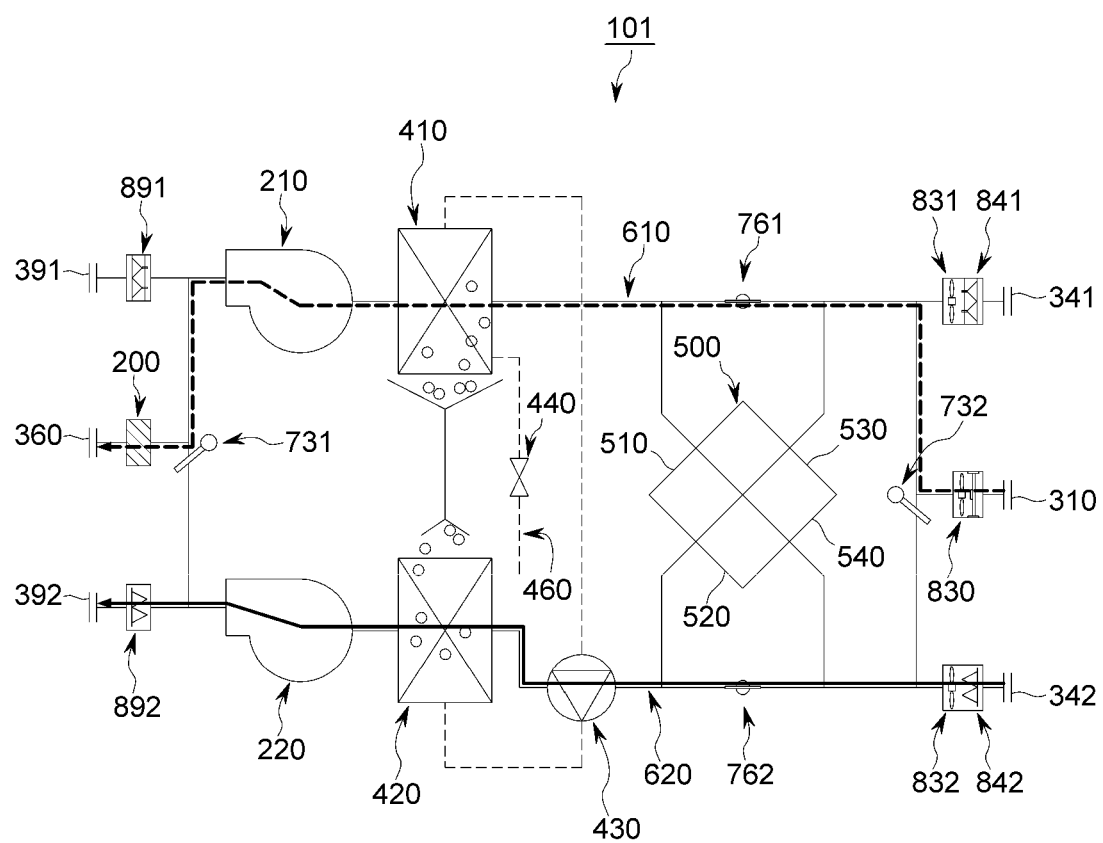

As shown in FIGS. 5 and 6, when the six port air conditioner 101 operates in the summer cooling, dehumidifying, and recirculation operation mode, the first air volume control damper 761 may completely open the space between the waste heat recovery heat exchanger 500 and the casing 300 in the first passage 610, and the second air volume control damper 762 may maximally open the space between the waste heat recovery heat exchanger 500 and the casing 300 in the second passage 620, and the air supply direction change damper 731 may block the space between the second passage 620 and the air supply port 360, and the indoor air intake direction change damper 732 may block the space between the second passage 620 and the indoor air intake port 310. In this case, the first discharge damper 891 may block the first discharge port 391, and the first intake damper 841 may block the first outdoor air intake port 341.

Accordingly, the outdoor air sucked through the second outdoor air intake port 342 may move to the second passage 620 and pass through the condenser 420 to be discharged to the outside through the second discharge port 392. In addition, the indoor air sucked through the indoor air intake port 310 may move to the first passage 610 and pass through the evaporator 410 to be supplied back into the room through the air supply port 360.

In this way, the indoor air sucked through the indoor air intake port 310 moves back into the room through the evaporator 410, so that the thermal efficiency can be increased, the cooling efficiency can be greatly improved, and the indoor dehumidification effect can be obtained. This is because that as the air passes through the evaporator, the air is cooled and condensed water is generated, which lowers the humidity of the air supplied into the room.

Accordingly, when ventilation is not required, when the six port air conditioner 101 operates in the summer cooling, dehumidification, and recirculation operation mode, because heat loss due to ventilation is not generated, it is possible to greatly improve the cooling performance.

Figure 7:
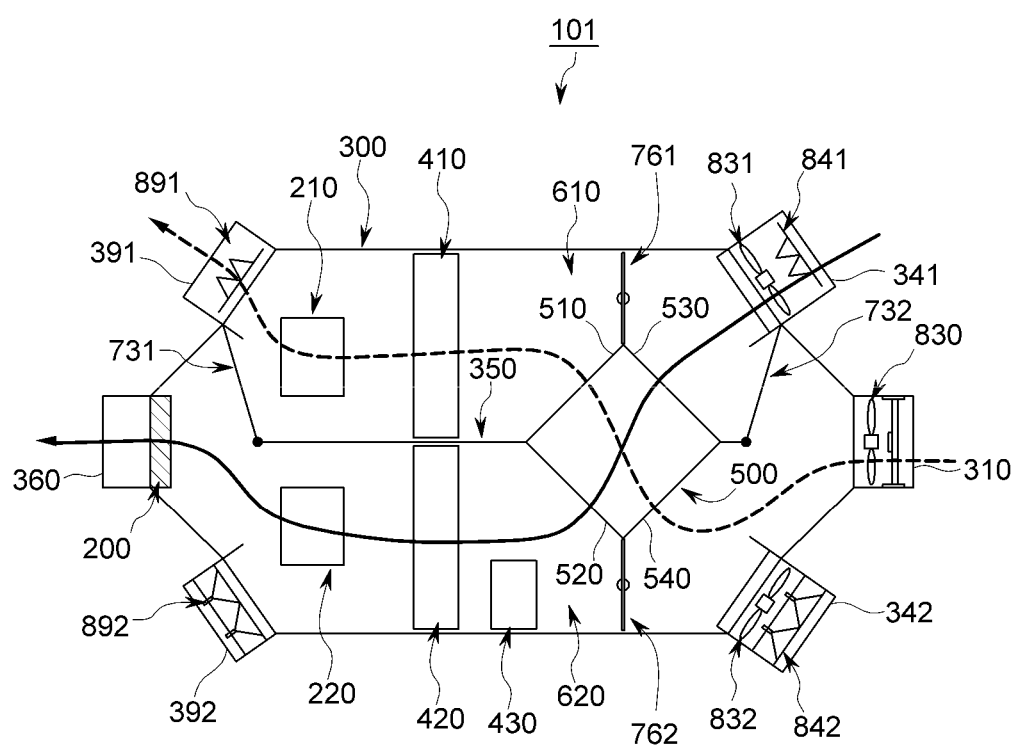
Figure 8:
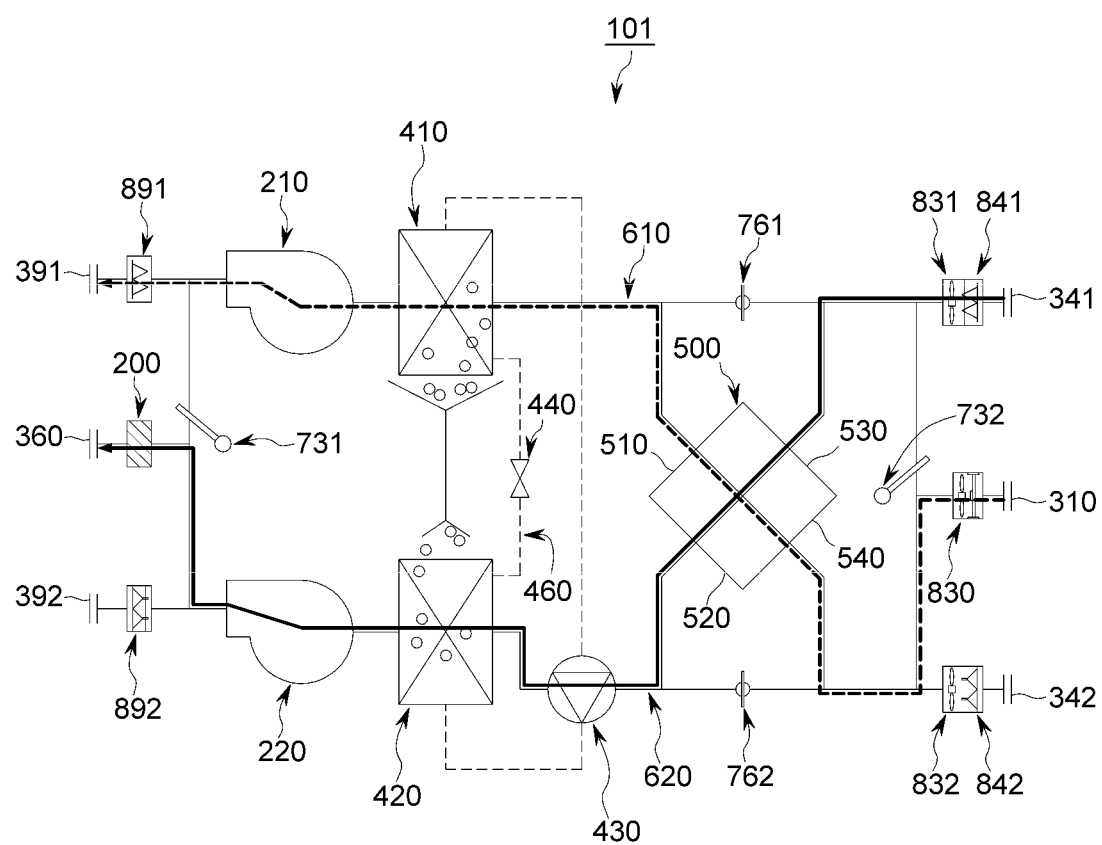

As shown in FIGS. 7 and 8, when the six port air conditioner 101 operates in the winter heating, humidification, and full outdoor air ventilation operation mode, the first air volume control damper 761 may block the space between the waste heat recovery heat exchanger 500 and the casing 300 in the first passage 610, the second air volume control damper 762 may block the space between the waste heat recovery heat exchanger 500 and the casing 300 in the second passage 620, the supply air direction change damper 731 may block between the first passage 610 and the air supply port 360, and the indoor air intake direction change damper 732 may block between the second passage 620 and the indoor air intake port 310. In this case, the second discharge damper 892 may block the second discharge port 392, and the second intake damper 842 may block the second outdoor air intake port 342.

Accordingly, the outdoor air sucked through the first outdoor air intake port 341 is blocked by the indoor air intake direction change damper 732 and the first air volume control damper 761, so that it may pass through the waste heat recovery heat exchanger 500 to move to the second passage 620 and pass through the condenser 420 to be supplied to the room through the air supply port 360. The indoor air sucked through the indoor air intake port 310 is blocked by the indoor air intake direction change damper 732 and the second air volume control damper 762, so that it may pass through the waste heat recovery heat exchanger 500 to move to the first passage 610 and pass through the evaporator 410 to be discharged to the outside through the first discharge port 391. In this case, the condenser 420 and the evaporator 410 constitute a heat pump.

In this way, because the outdoor air moves into the room through the condenser 420, the room can be heated. In addition, because the outdoor air first exchanges heat with the indoor air in the waste heat recovery heat exchanger 500 before going to the condenser 420, thermal efficiency can be increased.

Further, the heating efficiency of the heat pump can be improved by increasing the temperature of the evaporator with the indoor air that has passed through the waste heat recovery heat exchanger 500.

In addition, because the outdoor air sucked through the first outdoor air intake port 341 flows into the room, the air volume measured by the first outdoor air intake air volume sensor 831 installed in the first outdoor air intake port 341 becomes the ventilation air volume.

Furthermore, as shown in FIG. 8, water generated in the evaporator 410 is supplied to the condenser 420, and water vapor generated when the water supplied to the condenser 420 is evaporated is supplied into the room together with the outdoor air, which results in an increase in humidity of the indoor air. That is, according to the first embodiment of the present invention, when the six port air conditioner 101 operates in the winter heating, humidification, and full outdoor air ventilation operation mode, a humidification effect can be obtained.

This humidification effect can be obtained not only in the winter heating, humidification, and full outdoor air ventilation operation mode, but also in the winter heating, humidification, and partial outdoor air ventilation operation mode and the winter heating, humidification, and recirculation operation mode, which will be described later.

Figure 9:
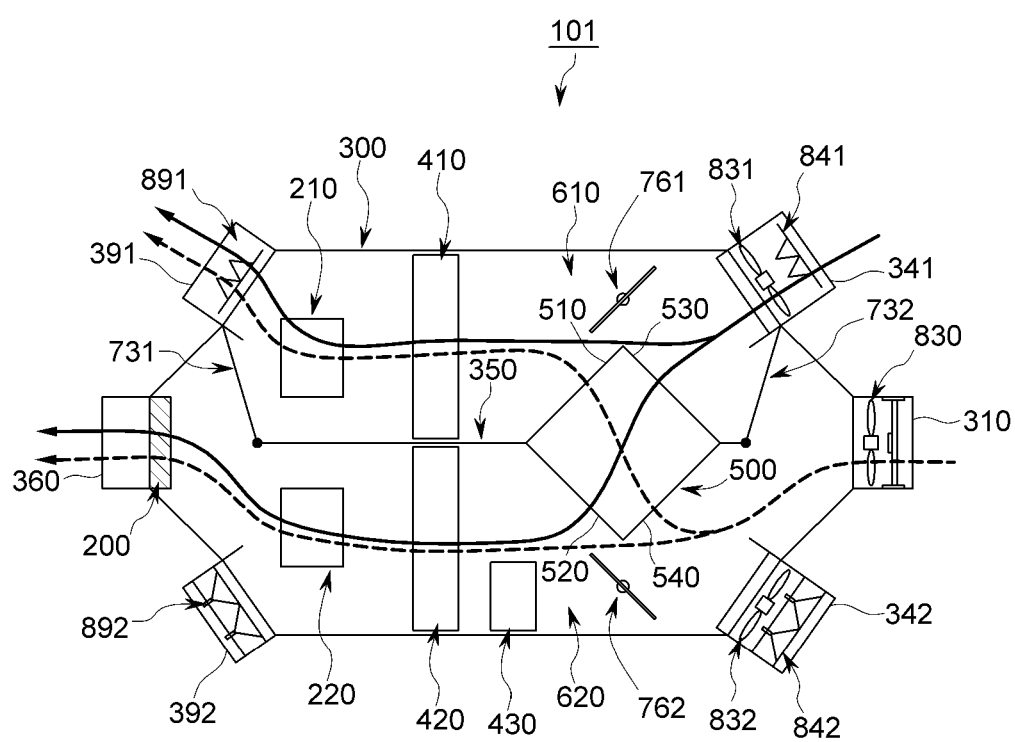
Figure 10:
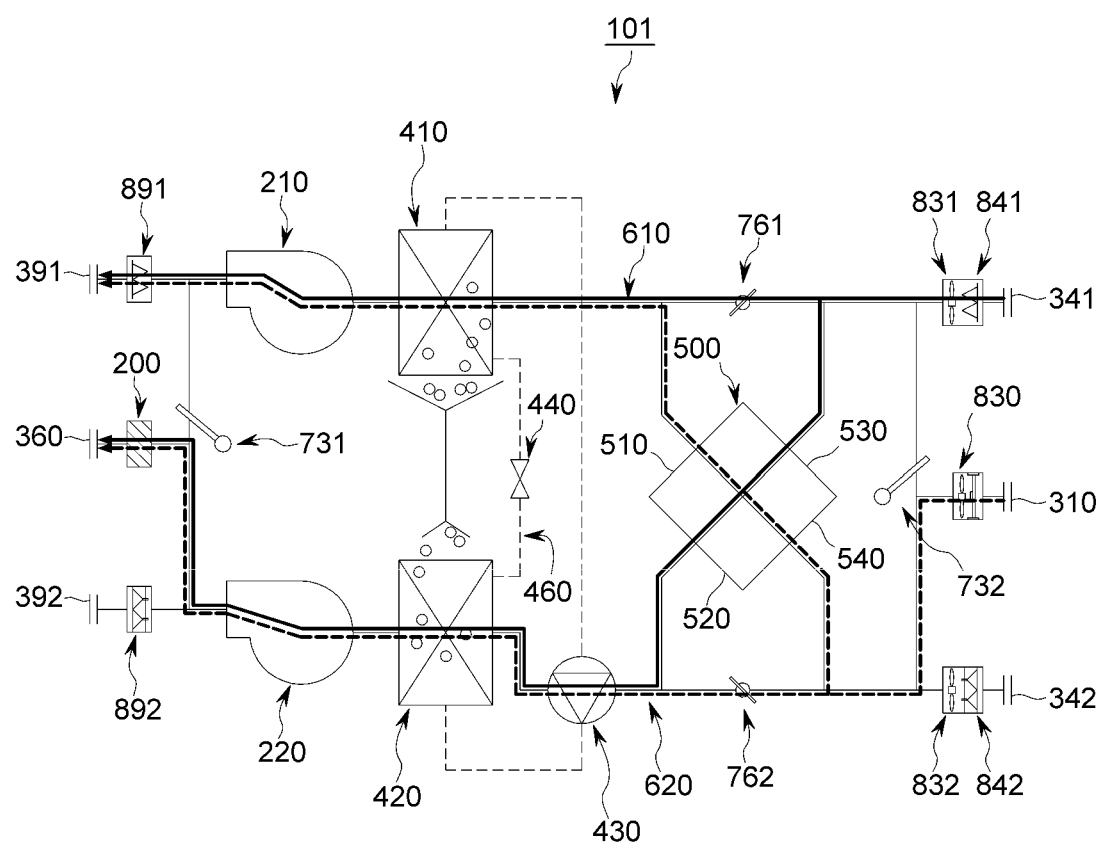

As shown in FIGS. 9 and 10, when the six port air conditioner operates in the winter heating, humidification, and partial outdoor air ventilation operation mode, the first air volume control damper 761 may partially open the space between the waste heat recovery heat exchanger 500 and the casing 300 in the first passage 610, the second air volume control damper 762 may partially open the space between the waste heat recovery heat exchanger 500 and the casing 300 in the second passage 620, the air supply direction change damper 731 may block the space between the first passage 610 and the air supply port 360, and the indoor air intake direction change damper 732 may block the space between the first passage 610 and the indoor air intake port 310. In this case, the second discharge damper 892 may block the second discharge port 392, and the second intake damper 842 may block the second outdoor air intake port 342.

Accordingly, some of the outdoor air sucked through the first outdoor air intake port 341 may pass through the waste heat recovery heat exchanger 500 to move to the second passage 620 and pass through the condenser 420 to be supplied into the room through the air supply port 360. The remaining of the outdoor air sucked through the first outdoor air intake port 341 may move along the first passage 610 and pass through the evaporator 410 to be discharged to the outside through the first discharge port 391. Some of the indoor air sucked through the indoor air intake port 310 may pass through the waste heat recovery heat exchanger 500 to move to the first passage 610 and pass through the evaporator 410 to be discharged to the outside through the first discharge port 391. The remaining of the indoor air sucked through the indoor air intake port 310 may move along the second passage 620 and pass through the condenser 420 to be supplied into the room through the air supply port 360.

In this way, because the outdoor air moves into the room through the condenser 420, the room can be heated. In addition, because the outdoor air exchanges heat with the indoor air in the waste heat recovery heat exchanger 500 before going to the condenser 420, thermal efficiency can be increased.

Further, some of the outdoor air is discharged to the outside again without passing through the waste heat recovery heat exchanger 500, and some of the indoor air is supplied back to the room without passing through the waste heat recovery heat exchanger 500. Thus. Although the ventilation air volume is reduced, it is possible to reduce heat loss due to ventilation and improve heating performance.

In addition, in the winter heating, humidification, and partial outdoor air ventilation operation mode, by measuring the temperature and air volume of the indoor air sucked through the indoor air intake port 310 and the temperature and air volume of the outdoor air sucked through the first outdoor air intake port 341, and comparing those measurements with the temperature and air volume of the mixed air of the indoor air that has passed through the waste heat recovery heat exchanger 500 after being sucked through the intake port 310 and the outdoor air that has passed through the first air volume control damper 761 without passing through the waste heat recovery heat exchanger 500, it is possible to estimate the air volume of outdoor air supplied into the room, that is, the ventilation air volume.

Figure 11:
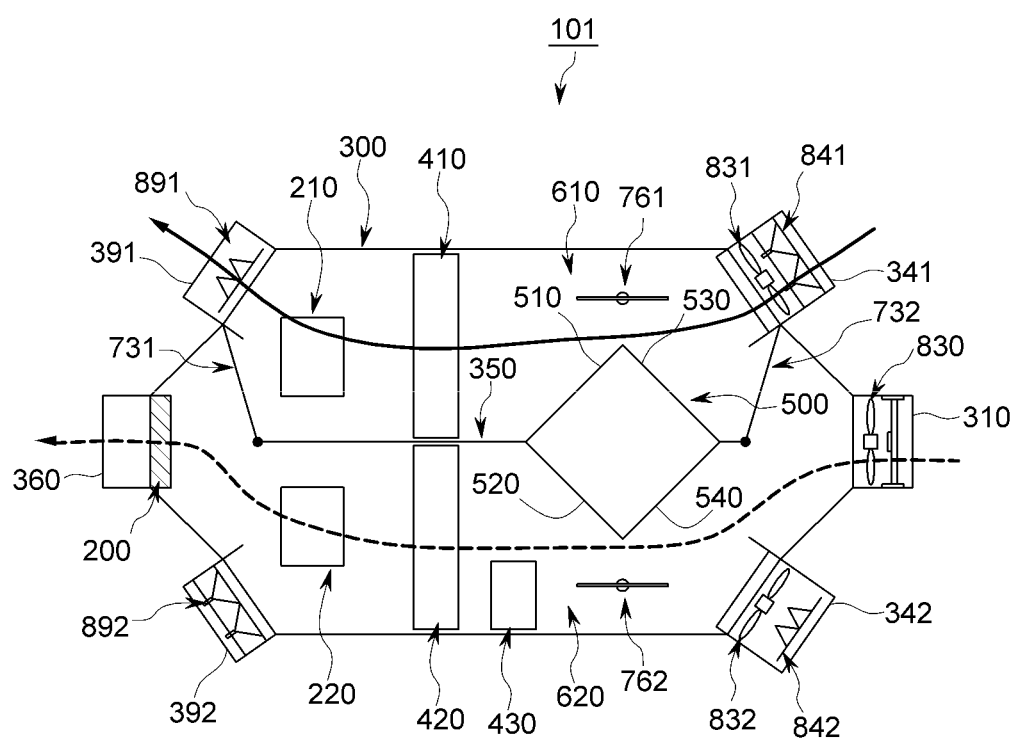
Figure 12:
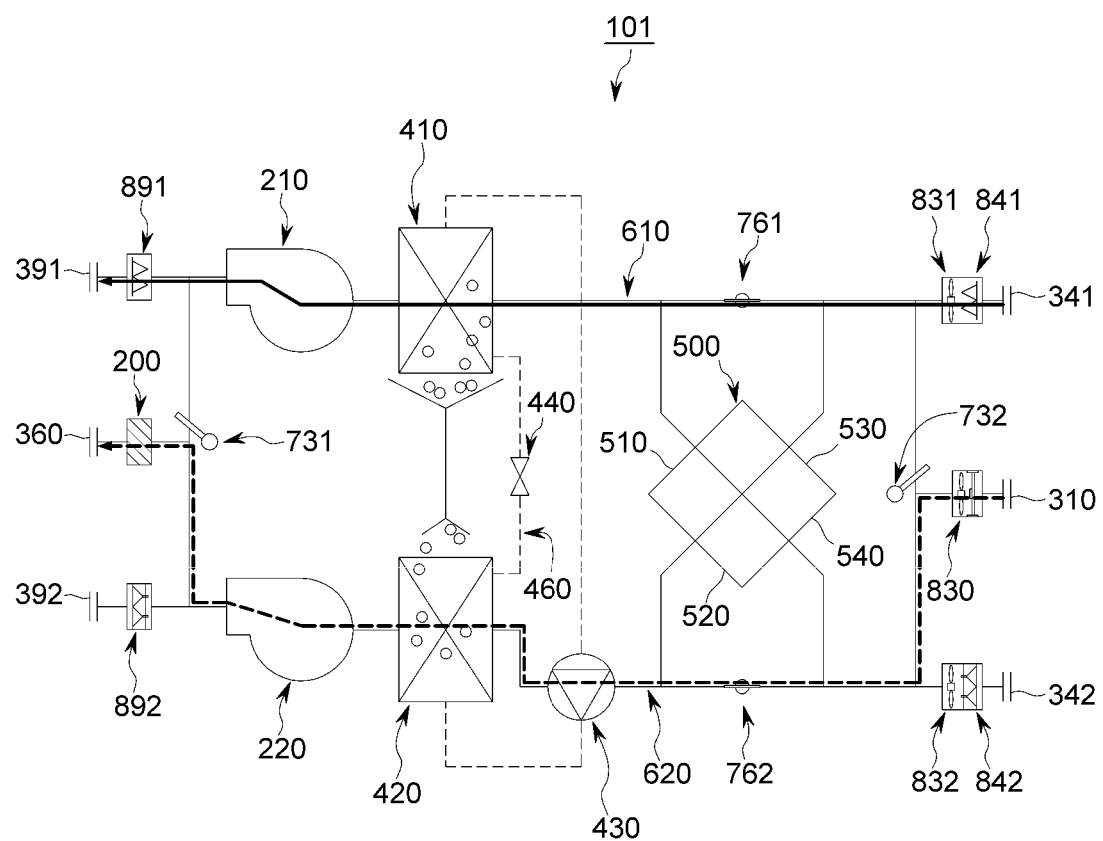

As shown in FIGS. 11 and 12, when the six port air conditioner 101 operates in the winter heating, humidification, and recirculation operation mode, the first air volume control damper 761 may completely open the space between the waste heat recovery heat exchanger 500 and the casing 300 in the first passage 610, and the second air volume control damper 762 may completely open the space between the waste heat recovery heat exchanger 500 and the casing 300 in the second passage 620, the air supply direction change damper 731 may block the space between the first passage 610 and the air supply port 360, and the indoor air intake direction change damper 732 may block the space between the first passage 610 and the indoor air intake port 310. In this case, the second discharge damper 892 may block the second discharge port 391, and the second intake damper 842 may block the second outdoor air intake port 342.

Accordingly, the outdoor air sucked through the first outdoor air intake port 341 may move to the first passage 610 and pass through the evaporator 410 to be discharged to the outside through the first discharge port 391. In addition, the indoor air sucked through the indoor air intake port 310 may move to the second passage 620 and pass through the condenser 420 to be supplied into the room again through the air supply port 360.

As described above, the indoor air sucked through the indoor air intake port 310 moves back into the room through the condenser 420, so that the thermal efficiency can be increased, the heating efficiency can be greatly improved, and the indoor humidification effect can be obtained. This is because the water vapor evaporated in the condenser 420 is supplied into the room together with the heated air.

Accordingly, when ventilation is not required, when the six port air conditioner 101 operates in the winter heating, humidification, and recirculation operation mode, heat loss due to ventilation is not generated. As a result, heating performance can be greatly improved.

Figure 13:
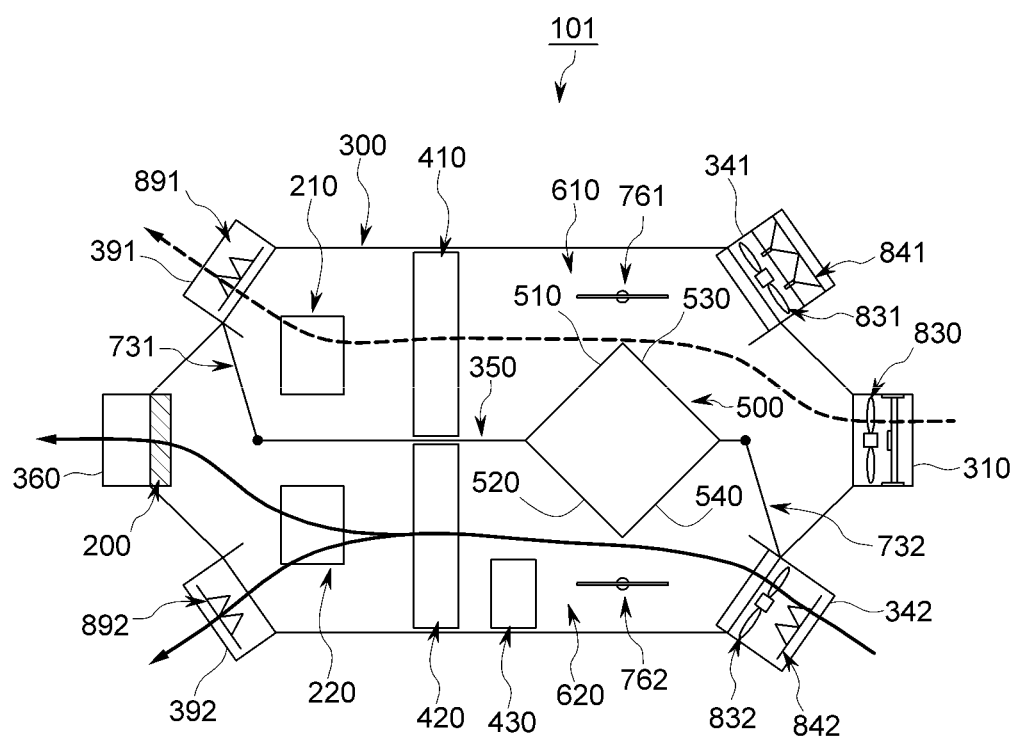

As shown in FIG. 13, when the six port air conditioner 101 operates in the winter defrosting operation mode, the first air volume control damper 761 may completely open the space between the waste heat recovery heat exchanger 500 and the casing 300 in the first passage 610, the second air volume control damper 762 may completely open the space between the waste heat recovery heat exchanger 500 and the casing 300 in the second passage 620, the air supply direction change damper 731 may block between the first passage 610 and the air supply port 360, and the indoor air intake direction change damper 732 may block between the second passage 620 and the indoor air intake port 310. In this case, the first intake damper 841 may block the first outdoor air intake 341.

Accordingly, the outdoor air sucked through the second outdoor air intake port 342 moves to the second passage 620 and passes through the condenser to move to the second discharge port 392 and the air supply port 360. The indoor air sucked through the indoor air intake port 310 moves to the first passage 610 and passes through the evaporator 410 to move to the first discharge port 391.

When ice is generated inside the six port air conditioner 101 in winter, the six port air conditioner 101 operates in the winter defrost operation mode to remove the ice. That is, in the winter defrosting operation mode, the frozen evaporator 410 and the waste heat recovery heat exchanger 500 can be heated with warm indoor air.

However, in the winter defrosting operation mode, the compressor 430 may not be operated when sufficient defrosting is possible with warm indoor air.

Figure 14:
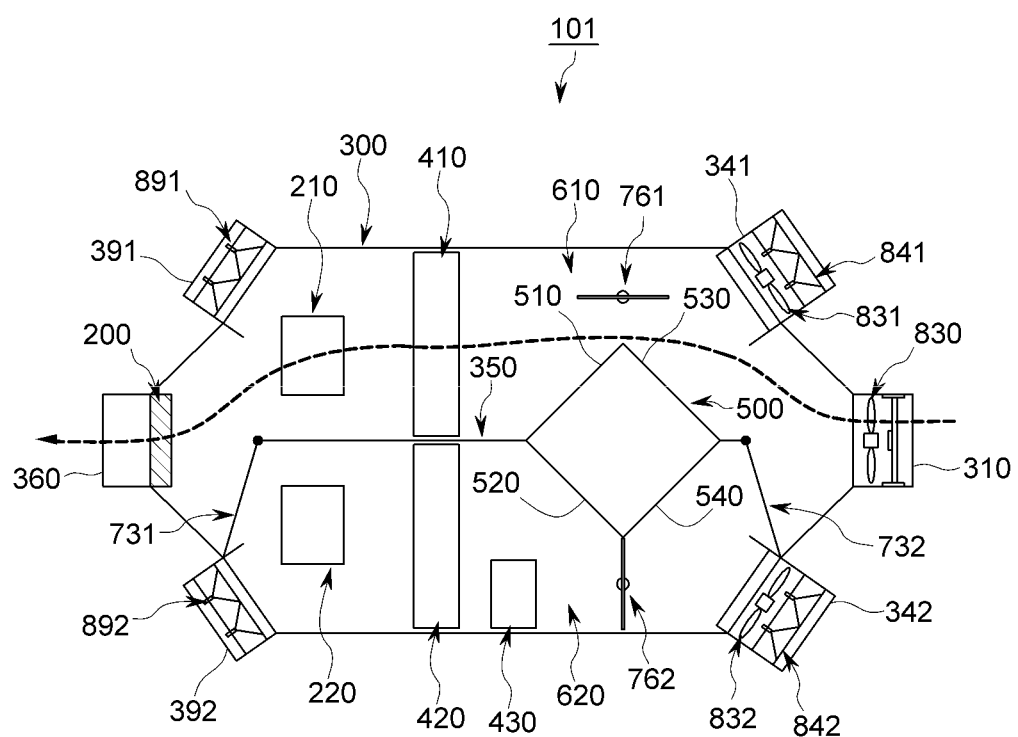

As shown in FIG. 14, when the six port air conditioner 101 operates in the changing season recirculation operation mode, the first air volume control damper 761 may completely open the space between the waste heat recovery heat exchanger 500 and the casing 300 in the first passage 610, the second air volume control damper 762 may block the space between the waste heat recovery heat exchanger 500 and the casing 300 in the second passage 620, the air supply direction change damper 731 may block between the second passage 620 and the air supply port 360, and the indoor air intake direction change damper 732 may block between the second passage 620 and the indoor air intake port 310. In this case, the first discharge damper 891 may block the first discharge port 391, the second discharge damper 892 may block the second discharge port 392, the first intake damper 841 may block the first outdoor air intake port 341, and the second intake damper 842 may block the second outdoor air intake port 342.

Accordingly, the indoor air sucked through the indoor air intake port 310 can move to the first passage 610 and pass through the evaporator 410 and the filter unit 200 to be supplied back into the room through the air supply port 360.

In this way, when the indoor air is recirculated, the indoor air is purified while passing through the filter unit 200 installed in the air supply port 360. That is, in the changing season recirculation operation mode, it is possible to purify the indoor air while recirculating the air in a state in which cooling and heating are not operated.

In addition, in the changing season recirculation operation mode, the compressor 430 is not operated. Accordingly, the refrigerant does not circulate between the evaporator 410 and the condenser 420, and the refrigeration cycle or the heat pump is not formed.

Figure 15:
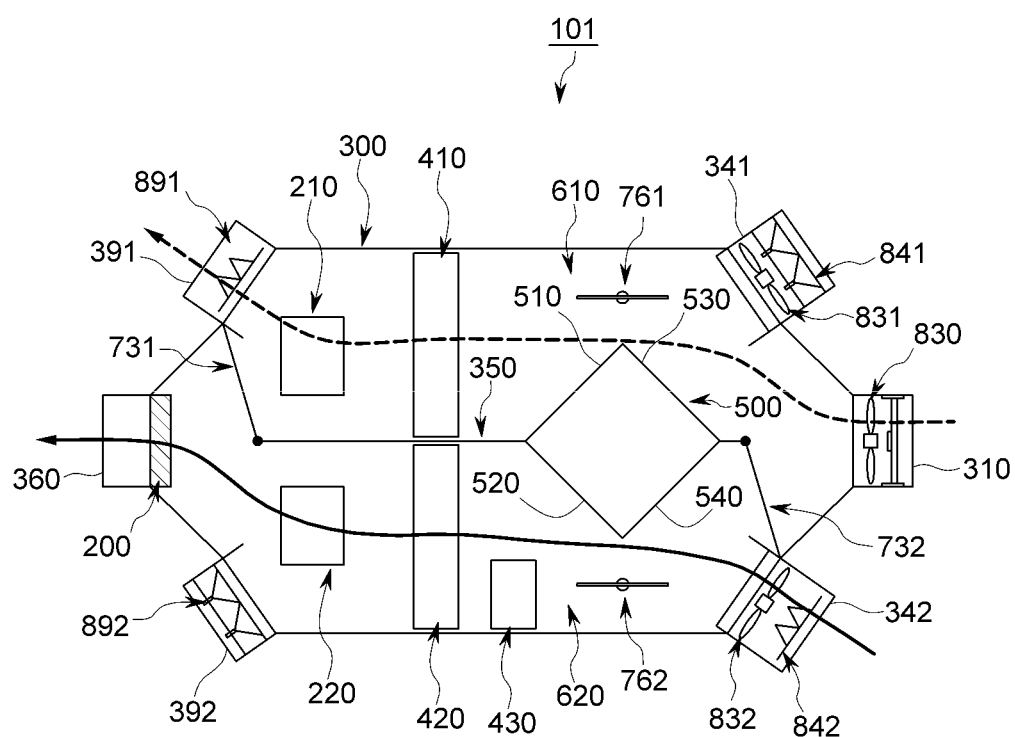

As shown in FIG. 15, when the six port air conditioner 101 operates in the changing season ventilation operation mode, the first air volume control damper 761 may completely open the space between the waste heat recovery heat exchanger 500 and the casing 300 in the first passage 610, the second air volume control damper 762 may completely open the space between the waste heat recovery heat exchanger 500 and the casing 300 in the second passage 620, the air supply direction change damper 731 may block between the first passage 610 and the air supply port 360, and the indoor air intake direction change damper 732 may block between the second passage 620 and the indoor air intake port 310. In this case, the first discharge damper 891 may block the second discharge port 392, and the first intake damper 841 may block the first outdoor air intake port 341.

Accordingly, the outdoor air sucked through the second outdoor air intake port 342 can move to the second passage 620 and pass through the condenser 420 to be supplied into the room through the air supply port 360. The indoor air sucked through the indoor air intake port 310 can move to the first passage 610 and pass through the evaporator 410 to be discharged to the outside through the first discharge port 391.

As described above, in the changing season ventilation operation mode, it is possible to ventilate the room by supplying outdoor air to the room and discharging the indoor air to the outside in a state in which heating and cooling are not operated.

In addition, the compressor 430 is not operated also in the changing season ventilation operation mode. As a result, the refrigerant does not circulate between the evaporator 410 and the condenser 420, and the refrigeration cycle or the heat pump is not formed.

With such configurations, the six port air conditioner 101 according to the first embodiment of the present invention can efficiently perform cooling, heating, dehumidification, humidification, defrost, air cleaning, and ventilation by converting airflow in various ways with the six air inlets and outlets. The six port air condition 101 can also perform energy-saving operation with a compact configuration without a separate outdoor unit by implementing the above with an integrated structure.

In addition, according to the first embodiment of the present invention, the six port air conditioner 101 can efficiently perform cooling, dehumidification, heating, humidification, defrost, and ventilation with one air conditioner, unlike the method of implementing heating and cooling by switching the evaporation coil and the condensing coil with a four-way valve of a conventional heat pump.

The first embodiment of the present invention is not limited to the above, and if necessary, the operations of the evaporator 410 and the condenser 420 may be switched using the four-way valve. In other words, the six port air conditioner 101 according to the first embodiment of the present invention does not necessarily require the four-way valve, and it is possible to perform cooling, dehumidification, heating, humidification, defrost, and ventilation with one air conditioner without using the four sides. However, if necessary, the operations of the evaporator 410 and the condenser 420 may be switched using the four-way valve.

Hereinafter, a second embodiment of the present invention will be described with reference to FIG. 16.

Figure 16:
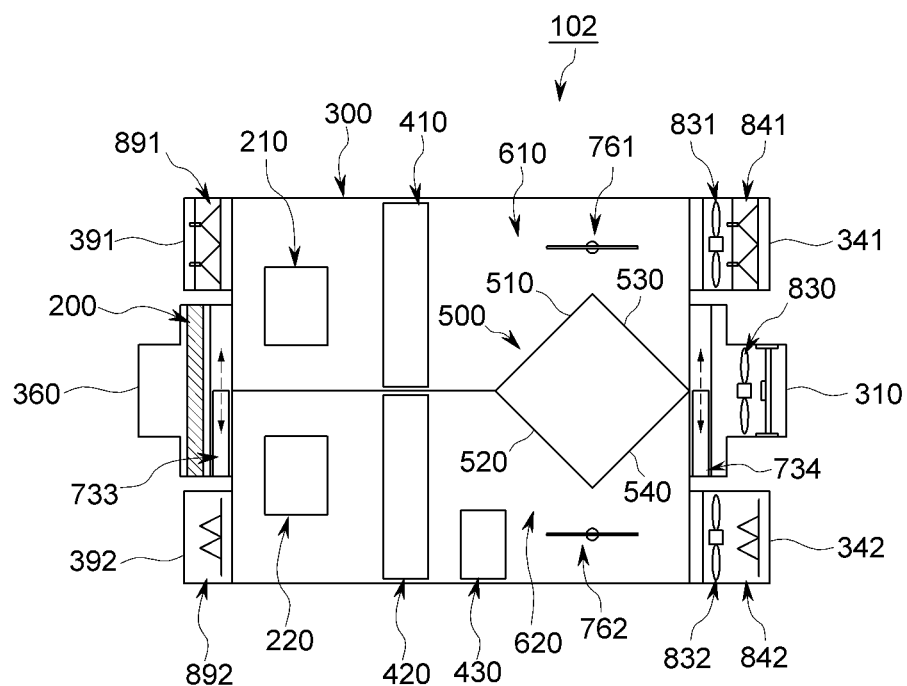
FIG. 16 is a configuration diagram of a six port air conditioner according to a second embodiment of the present invention.

As shown in FIG. 16, in the six port air conditioner 102 according to the second embodiment of the present invention, the air supply port 360 may be divided into a first air supply area facing the first passage 610 and a second air supply area facing the a second passage 620. Further, the indoor air intake port 310 may be divided into a first indoor air intake area facing the first passage 610 and a second indoor air intake area facing the second passage 620.

Further, in the second embodiment of the present invention, each of the air supply direction change damper 733 and the indoor air intake direction change damper 734 may be a slide type damper.

Specifically, the air supply direction change damper 733 may slide between the first air supply area and the second air supply area of the air supply port 360 and may selectively block one of the first air supply area and the second air supply area to change the air supply direction. In addition, the indoor air intake direction change damper 734 may slide between the first indoor air intake area and the second indoor air intake area of the indoor air intake port 310 and may selectively block one of the first indoor air intake area and the second indoor air intake area to change the indoor air intake direction.

FIG. 16 illustratively shows a state in which the six port air conditioner 102 according to the second embodiment of the present invention operates in the summer cooling, dehumidification, and recirculation operation mode. The operating principle is the same as that of FIG. 5 of the first embodiment described above.

Further, the six port air conditioner 102 according to the second embodiment of the present invention may operate in the same manner as in the first embodiment in the operation modes other than the summer cooling, dehumidification, and recirculation operation mode. Only type and structure of the direction change dampers 733 and 734 are different from those in the first embodiment.

With such configurations, the six port air conditioner 102 according to the second embodiment of the present invention can also efficiently perform cooling, heating, dehumidification, humidification, defrost, air cleaning, and ventilation by converting airflow in various ways with the six air inlets and outlets. The six port air conditioner 102 can also perform energy-saving operation with a compact configuration without a separate outdoor unit by implementing the above with an integrated structure.

Hereinafter, a third embodiment of the present invention will be described with reference to FIG. 17.

Figure 17:
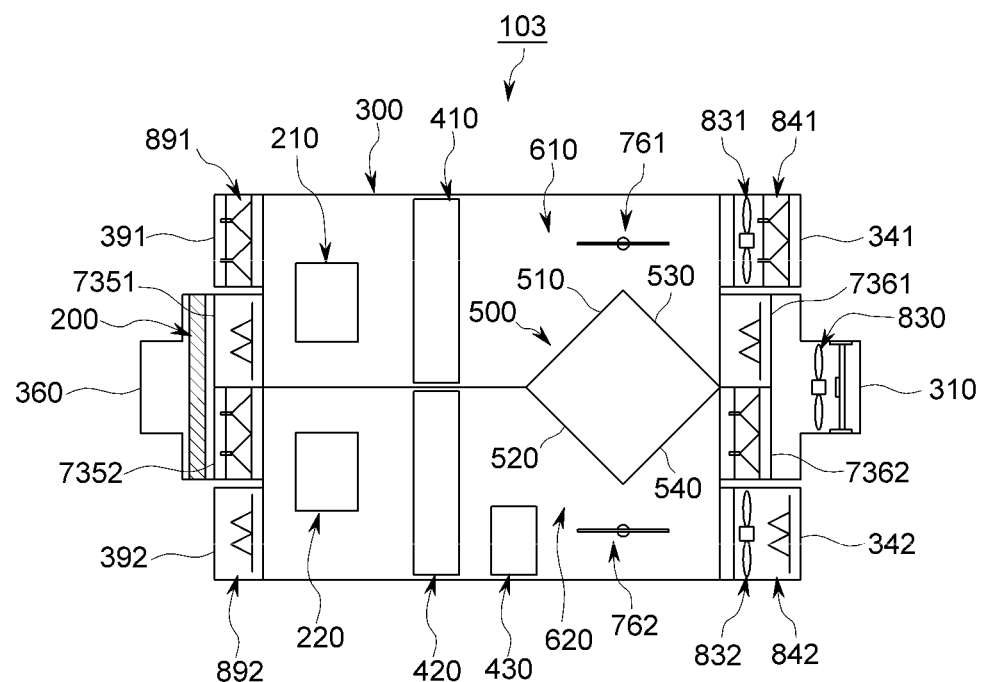
FIG. 17 is a configuration diagram of a six port air conditioner according to a third embodiment of the present invention.

As shown in FIG. 17, in the six port air conditioner 103 according to the third embodiment of the present invention, the air supply port 360 may be divided into a first air supply area facing the first passage 610, and a second air supply area facing the a second passage 620. Further, the indoor air intake port 310 may be divided into a first indoor air intake area facing the first passage 610 and a second indoor air intake area facing the second passage 620.

Further, in the third embodiment of the present invention, the air supply direction change damper 735 may include a first air supply direction change damper 7351 installed in the first air supply area of the air supply port 360 and a second air supply direction change damper 7352 installed in the second air supply area of the air supply port 360.

That is, the first air supply direction change damper 7351 and the second air supply direction change damper 7352 selectively block one of the first air supply area and the second air supply area of the air supply port 360 to change the air supply direction.

In addition, the indoor air intake direction change damper 736 may include a first indoor air intake direction change damper 7361 installed in the first indoor air intake area of the indoor air intake port 310 and a second indoor air intake direction change damper 7362 installed in the second indoor air intake area.

That is, the first indoor air intake direction change damper 7361 and the second indoor air intake direction change damper 7362 selectively block one of the first indoor air intake area and the second indoor air intake area of the indoor air intake port 310 to change the indoor air intake direction.

FIG. 17 illustratively shows a state in which the six port air conditioner 103 according to the third embodiment of the present invention operates in the summer cooling, dehumidification, and recirculation operation mode. The operating principle is the same as that of FIG. 5 of the first embodiment described above.

Further, the six port air conditioner 103 according to the third embodiment of the present invention may operate in the same manner as in the first embodiment in the operation modes other than the summer cooling, dehumidification, and recirculation operation mode. Only type and structure of the direction change dampers 733 and 734 are different from those in the first embodiment.

With such configurations, the six port air conditioner 103 according to the third embodiment of the present invention can also efficiently perform cooling, heating, dehumidification, humidification, defrost, air cleaning, and ventilation by converting airflow in various ways with the six air inlets and outlets. The six port air condition 103 can also perform energy-saving operation with a compact configuration without a separate outdoor unit by implementing the above with an integrated structure.

Hereinafter, a fourth embodiment of the present invention will be described with reference to FIGS. 18 to 21.

Figure 18:
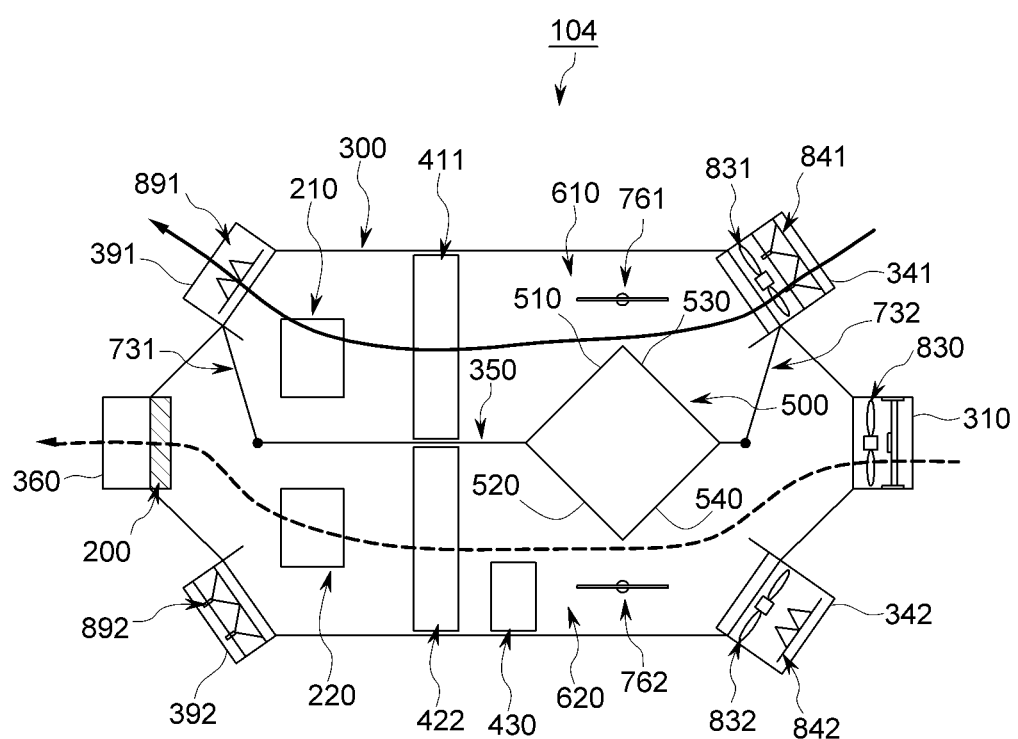
FIGS. 18 to 21 are views showing a six port air conditioner according to a fourth embodiment of the present invention.
Figure 20:
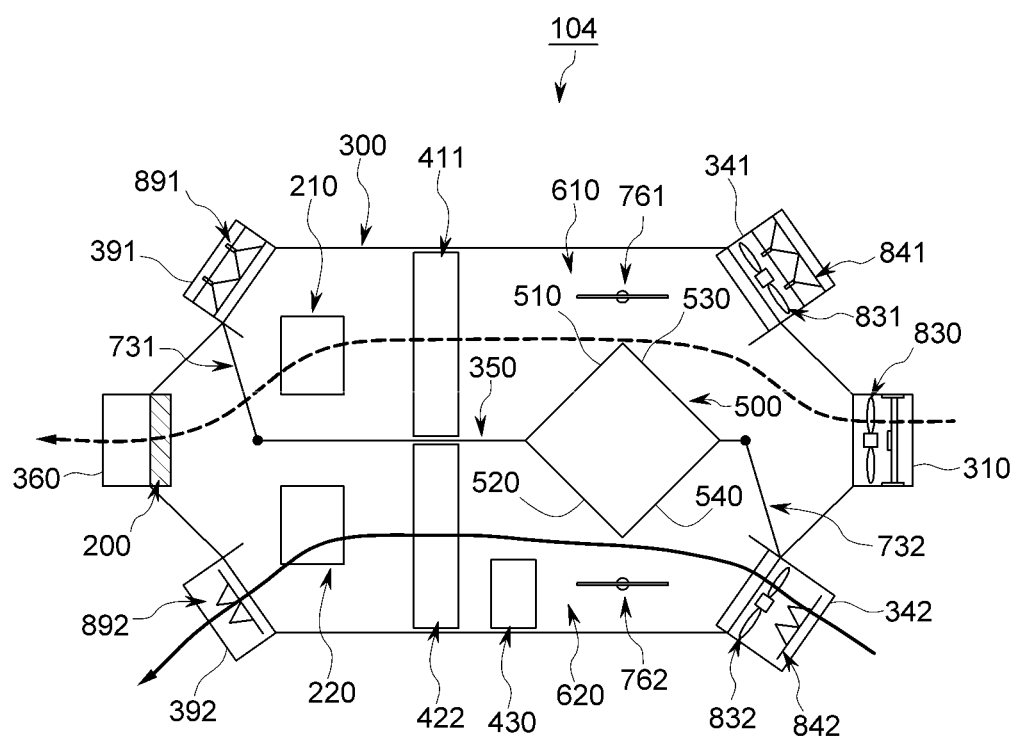

As shown in FIGS. 18 and 20, the six port air conditioner 104 according to the fourth embodiment of the present invention may include a first heat exchanger 411 disposed between a first discharge port 391 and an air supply port 360, and a waste heat recovery heat exchanger 500 in the first passage 610, and a second heat exchanger 422 disposed between a second discharge port 392 and the air supply port 360, and the waste heat recovery heat exchanger 500 in the second passage 620.

In the previous embodiments, the evaporator 410 is disposed between the first discharge port 391 and the air supply port 860, and the waste heat recovery heat exchanger 500 in the first passage 610, and the condenser 420 is disposed between the second discharge port 392 and the air supply port 860, and the waste heat recovery heat exchanger 500 in the second passage 620.

However, in the fourth embodiment of the present invention, any one of the first heat exchanger 411 or the second heat exchanger 422 may be the evaporator and the other may be the condenser, and roles may be repeatedly exchanged with each other. That is, the first heat exchanger 411 and the second heat exchanger 422 may be the evaporator and the condenser, respectively, or the first heat exchanger 411 and the second heat exchanger 422 may be the condenser and the evaporator, respectively.

Figure 19:
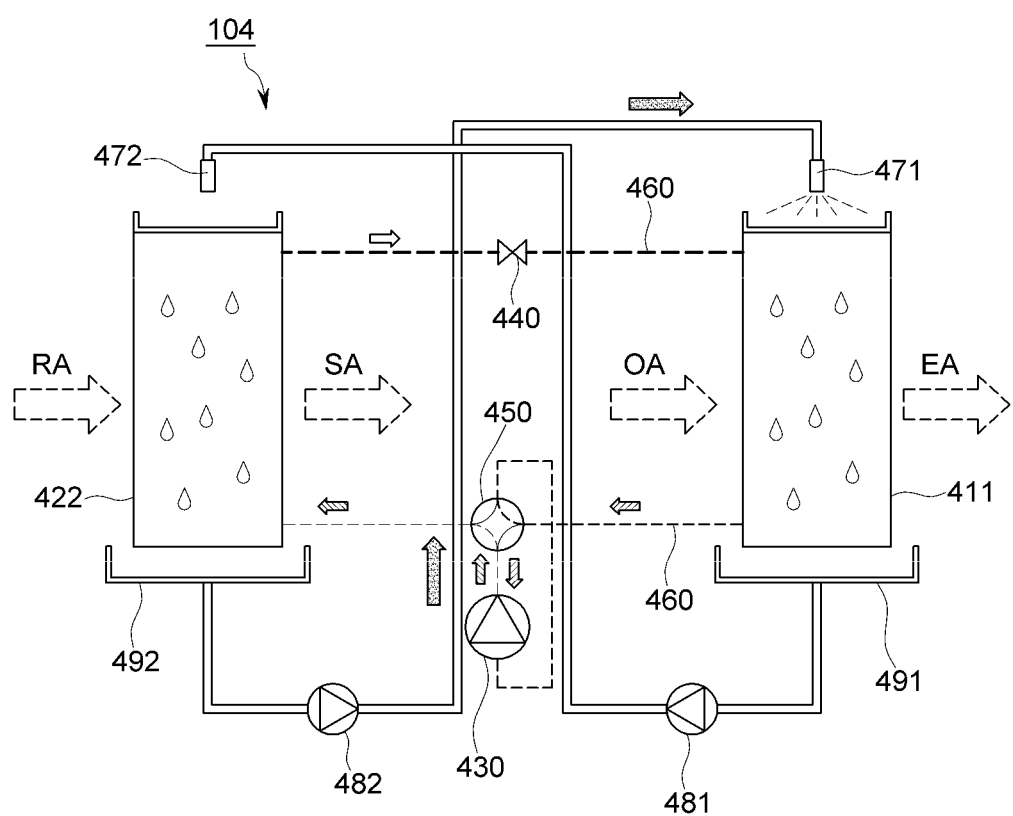
Figure 21:
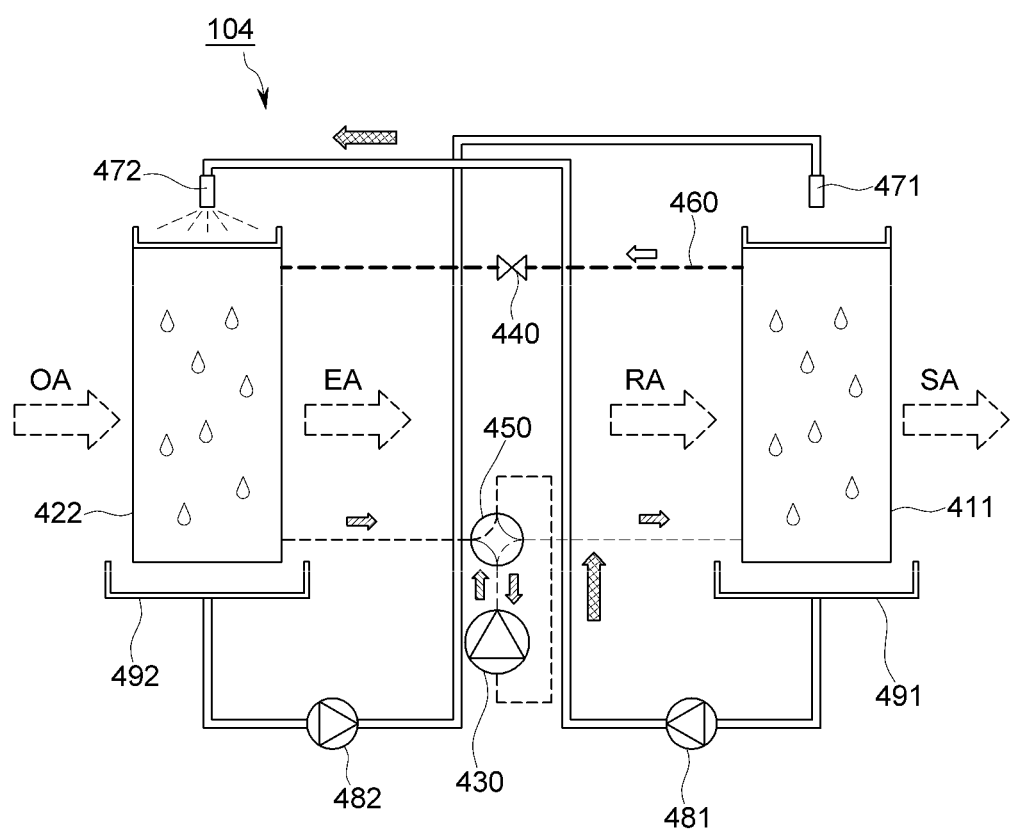

Further, as shown in FIGS. 19 and 21, the six port air conditioner 104 may further include a refrigerant flow path 460 through which the refrigerant flows between the first heat exchanger 411 and the second heat exchanger 422, an expansion valve 440 installed in the refrigerant flow path 460, a compressor 430 installed in the refrigerant flow path 460 to compress the refrigerant, and a four-way valve 450 for switching the suction and discharge paths of the compressor 430.

In addition, the six port air conditioner 104 may further include a first condensate collection fan 491 for collecting condensed water generated in the first heat exchanger 411, a second condensate collection fan 492 for collecting condensed water generated in the second heat exchanger 422, a first condensate spraying unit 471 for spraying the condensed water collected in the second condensate collecting fan 492 to the first heat exchanger 411, a second condensate spraying unit 472 for spraying the condensed water collected in the first condensate collecting fan 491 to the second heat exchanger 422, a first condensate pump 481 for supplying the condensed water collected in the first condensate collecting fan 491 to the second condensate spraying unit 472, and a second condensate pump 482 for supplying the condensed water collected in the second condensate collecting fan 492 to the first condensate spraying unit 471.

In FIGS. 19 to 21, outdoor air (OA) is introduced through the first outdoor air intake port 341 or the second outdoor air intake port 342, indoor air (RA) is sucked through the indoor air intake port 310, air (EA) is discharged through the first discharge port 391 or the second discharge port 392, and supply air (SA) is supplied to the room through the air supply port 360.

In addition, the six port air conditioner 104 according to the fourth embodiment of the present invention may operate in a continuous heating operation mode in winter.

When the six port air conditioner 104 operates in the winter continuous heating operation mode, it has a first heating cycle and a second heating cycle. In the first heating cycle, refrigerant discharged from the compressor 430 flows through the four-way valve 450 toward the second heat exchanger 422 to allow the second heat exchanger 422 and the first heat exchanger 411 to respectively operate as the condenser and the evaporator, and the first air volume control damper 761, the second air volume control damper 762, and the direction change dampers 731 and 732 operate to allow the indoor air sucked through the indoor air intake port 310 to be heated through the second heat exchanger 422 operating as the condenser and to be supplied into the room through the air supply port 360. In the second heating cycle, the refrigerant discharged from the compressor 430 flows through the four-way valve 450 toward the first exchanger 411 to allow the first heat exchanger 411 and the second heat exchanger 422 to respectively operate as the condenser and the evaporator, and the first air volume control damper 761, the second air volume control damper 762, and the direction change dampers 731 and 732 operate to allow the indoor air sucked through the indoor air intake port 310 to be heated through the first heat exchanger 422 operating as the condenser and to be supplied into the room through the air supply port 360. The first heating cycle and the second heating cycle are alternately and repeatedly operated.

In this case, the indoor air sucked in through the indoor air intake port 310 may be directed toward the air supply port 360 without passing through the waste heat recovery heat exchanger 500, or may pass through the waste heat recovery heat exchanger 500 to be directed toward the air supply port 360 depending on the operations of the first air volume control damper 761, the second air volume control damper 762, and the direction change dampers 731 and 732.

Further, the first heating cycle and the second heating cycle may be alternately repeated according to a preset cycle, or alternately repeated according to the freezing state of the first heat exchanger 411 or the second heat exchanger 422 operating as the evaporator. In this case, to determine the freezing state of the first heat exchanger 411 and the second heat exchanger 422, the temperature of the outdoor air or the temperatures of the first heat exchanger 411 and the second heat exchanger 422 may be measured.

As described above, in the winter continuous heating operation mode of the six port air conditioner 104 according to the fourth embodiment of the present invention, because the first heating cycle and the second heating cycle are operated alternately and repeatedly, the first heat exchanger 411 or the second heat exchanger 422 operating as the evaporator is frequently converted to the condenser. As a result, the heating mode can be continuously maintained without requiring a separate defrost operation. That is, the winter defrost operation mode as described above with reference to FIG. 13 is unnecessary.

In addition, in the first heating cycle, the second condensate pump 482 is operated to spray condensed water to the first heat exchanger 411 to be frozen on the first heat exchanger 411, and the condensed water frozen on the second heat exchanger 422 is vaporized and supplied into the room together with the indoor air to increase the humidity in the room. In the second heating cycle, the first condensate pump 481 is operated, condensed water is sprayed to the second heat exchanger 422 to be frozen on the second heat exchanger 422, and the condensed water frozen on the first heat exchanger 411 is vaporized and supplied into the room together with the indoor air to increase the humidity in the room.

Further, although not shown in FIGS. 19 to 21, some of the condensed water supplied by the first condensate pump 481 and the second condensate pump 482 to the second condensate spraying unit 472 and the first condensate spraying unit 471, respectively, may be drained to the outside. To this end, a drain valve (not shown) may be provided between the first condensate pump 481 and the second condensate spraying unit 472 and between the second condensate pump 482 and the first condensate spraying unit 471. In this way, by draining some of the condensed water supplied by the first condensate pump 481 and the second condensate pump 482 to the second condensate spraying unit 472 and the first condensate spraying unit 471, respectively, to the outside to control the amount of condensed water formed on the heat exchanger 422 or the first heat exchanger 411, it is possible to control the amount of humidification and adjust the indoor humidity. That is, it is possible to prevent the humidity in the room from becoming higher than necessary due to an excessive amount of condensed water on the second heat exchanger 422 or the first heat exchanger 411.

Furthermore, in the winter continuous heating operation mode, most of the condensed water is frozen on the evaporator. Moreover, the non-frozen condensate may drop to be stored in the first condensate collection fan 491 or the second condensate collection fan 492 and then may move to the condenser through the first condensate pump 481 or the second condensate pump 482.

In addition, the condensed water that has not been evaporated from the condenser may drop to be stored in the first condensed water collection fan 491 or the second condensed water collection fan 492. Then, the condensed water is supplied to the evaporator by the first or second condensed water pump 482 to be frozen on the evaporator.

With such configurations, the six port air conditioner 104 according to the fourth embodiment of the present invention can convert air flows in various ways with the six air inlets and outlets to enable the winter continuous heating operation mode.

In a general winter heating mode, heating efficiency can be maintained only when the winter defrost operation mode as described above with reference to FIG. 13 is operated once to defrost the evaporator on which frost is formed. Because the defrost operation mode should be maintained for about 10 minutes, heating is stopped in the meantime, and cold air is inevitably supplied into the room.

However, according to the fourth embodiment of the present invention, it is possible to continuously maintain heating without stopping the heating and also obtain an indoor humidification effect. Specifically, the condensed water frozen on the condenser is vaporized and evaporated by the heat of condensation generated in the condenser and heat of the hot air in the room, and then supplied into the room, which increases the humidity in the room.

In addition, the winter continuous heating operation mode as described above is feasible since the first blower 210 and the second blower 220 of the six port air conditioner 104 may serve as the air supply fan or the discharge fan depending on the operation mode thereof. The outdoor air intake port 341, 342 and the discharge ports 391, 392 are each provided in pair to freely change the flow of the air flow inside the six port air conditioner 104.

Although the embodiments of the present invention have been described above with reference to the accompanying drawings, those skilled in the art to which the present invention pertains may understand that the present invention may be embodied in other specific forms without changing the technical spirit or essential characteristics thereof.

Therefore, the embodiments described above are to be understood as illustrative and not restrictive in all respects, and it should be construed that the scope of the present invention is indicated by the following claims, and all changes or modifications derived from the meaning and scope of the claims, and the equivalent concept thereof are included in the scope of the present invention.

A description of the reference numerals used in the drawing figures and this specification is below.

| | |
|---|---|
| 101: six port air conditioner | 200: filter unit |
| 210: first blower | 220: second blower |
| 300: casing | 310: indoor air intake port |
| 341: first outdoor air intake port | 342: second outdoor air intake port |
| 350: partition wall part | 360: air supply port |
| 391: first discharge port | 392: second discharge port |
| 410: evaporator | 411: first heat exchanger |
| 420: condenser | 422: second heat exchanger |
| 430: compressor | 440: expansion valve |
| 450: four-way valve | 460: refrigerant flow path |
| 471: first condensate spray unit | 472: second condensate spray unit |
| 481: first condensate pump | 482: second condensate pump |
| 491: first condensate collecting fan | 492: second condensate collecting fan |
| 500: waste heat recovery heat exchanger | |
| 510: first side | 520: second side |
| 530: third side | 540: fourth side |
| 610: first passage | 620: second passage |
| 731, 733, 735: supply air redirection damper | |
| 7351: first air supply direction change damper | |
| 7352: second air supply direction change damper | |
| 732, 734, 736: indoor air intake direction change damper | |
| 7361: first indoor air intake direction change damper | |
| 7362: second indoor air intake direction change damper | |
| 761: first air volume control damper | |
| 762: second air volume control damper | |
| 830: indoor air intake air volume sensor | |
| 831: first outdoor air intake air volume sensor | |
| 832: second outdoor air intake air volume sensor | |
| 841: first intake damper | 842: second intake damper |
| 891: first discharge damper | 892: second discharge damper |

The air conditioner having six ports according to the embodiments of the present disclosure can efficiently perform cooling, heating, dehumidification, humidification, defrost, air cleaning, and ventilation by converting airflow in various ways with the six air inlets and outlets, and the air conditioner can also perform energy-saving operation with a compact configuration without a separate outdoor unit by implementing the above with an integrated configuration.

What is claimed is:

1. An air conditioner having six ports, comprising:
   a casing in which at one end, a first discharge port, a second discharge port, and an air supply port disposed between the first discharge port and the second discharge port are formed, and at the other end, a first outdoor air intake port, a second outdoor air intake port, and an indoor air intake port disposed between the first outdoor air intake port and the second outdoor air intake port are formed;
   a partition wall part dividing an inner space of the casing into a first passage one end of which faces the first discharge port and the air supply port, and the other end of which faces the first outdoor air intake port and the indoor air intake port, and a second passage one end of which faces the second discharge port and the air supply port, and the other end of which faces the second outdoor air intake port and the indoor air intake port;
   a direction change damper connecting the air supply port and the indoor air intake port to the first passage or the second passage;
   a waste heat recovery heat exchanger in which air in the first passage moving to the second passage through the partition wall part and air in the second passage moving to the first passage through the partition wall part is subject to heat exchange with each other;
   a first air volume control damper for controlling an opening rate of a space between the waste heat recovery heat exchanger and the casing in the first passage; and
   a second air volume control damper for controlling an opening rate of a space between the waste heat recovery heat exchanger and the casing in the second passage.

2. The air conditioner of claim 1, wherein the direction change damper includes:
   an air supply direction change damper installed at the one end of the partition wall part to selectively block between the first passage and the air supply port or between the second passage and the air supply port; and
   an indoor air intake direction change damper installed at the other end of the partition wall part to selectively block between the first passage and the indoor air intake port or between the second passage and the indoor air intake port.

3. The air conditioner of claim 2, further comprising:
   an evaporator disposed between the first discharge port and the air supply port, and the waste heat recovery heat exchanger in the first passage;
   a condenser disposed between the second discharge port and the air supply port, and the waste heat recovery heat exchanger in the second passage, which exchanges refrigerant with the evaporator;
   a refrigerant flow path through which the refrigerant flows between the evaporator and the condenser;

an expansion valve installed in the refrigerant flow path;
a compressor disposed between the condenser and the waste heat recovery heat exchanger in the second passage to compress the refrigerant flowing along the refrigerant flow path; and
a filter unit disposed in the air supply port.

4. The air conditioner of claim 3, wherein
water generated in the evaporator is supplied to the condenser,
the condenser evaporates the water supplied from the evaporator into water vapor through heat of condensation, and
the water vapor generated in the condenser is supplied indoor in winter and discharged outdoor in summer.

5. The air conditioner of claim 1, further comprising:
a first blower disposed between the first discharge port and the air supply port, and the waste heat recovery heat exchanger in the first passage to blow air toward the first discharge port and the air supply port;
a second blower disposed between the second discharge port and the air supply port, and the waste heat recovery heat exchanger in the second passage to blow air toward the second discharge port and the air supply port,
a first discharge damper for controlling an air volume of air discharged through the first discharge port;
a second discharge damper for controlling an air volume of air discharged through the second discharge port;
a first intake damper for controlling an air volume of air sucked through the first outdoor air intake port; and
a second intake damper for controlling an air volume of air sucked through the second outdoor air intake port.

6. The air conditioner of claim 1, further comprising:
an indoor air intake air volume sensor for detecting an air volume of air sucked through the indoor air intake port;
a first outdoor air intake air volume sensor for detecting an air volume of air sucked through first outdoor air intake port; and
a second outdoor air intake air volume sensor for detecting an air volume of air sucked through the second outdoor air intake port.

7. The air conditioner of claim 3, wherein
when the air conditioner operates in a summer cooling, dehumidification, and full outdoor air ventilation operation mode,
the first air volume control damper blocks a space between the waste heat recovery heat exchanger and the casing in the first passage,
the second air volume control damper blocks a space between the waste heat recovery heat exchanger and the casing in the second passage,
the air supply direction change damper blocks between the second passage and the air supply port, and
the indoor air intake direction change damper blocks between the second passage and the indoor air intake port,
so that outdoor air sucked through the second outdoor air intake port is supplied into a room through the air supply port after passing through the waste heat recovery heat exchanger and the evaporator, and
indoor air sucked through the indoor air intake port is discharged to an outside through the second discharge port after passing through the waste heat recovery heat exchanger and the condenser.

8. The air conditioner of claim 3, wherein
when the air conditioner operates in a summer cooling, dehumidification, and partial outdoor air ventilation operation mode,
the first air volume control damper partially opens a space between the waste heat recovery heat exchanger and the casing in the first passage,
the second air volume control damper partially opens a space between the waste heat recovery heat exchanger and the casing in the second passage,
the air supply direction change damper blocks between the second passage and the air supply port, and
the indoor air intake direction change damper blocks between the second passage and the indoor air intake port,
so that some outdoor air sucked through the second outdoor air intake port is supplied into a room through the air supply port after passing through the waste heat recovery heat exchanger and the evaporator,
remaining outdoor air sucked through the second outdoor air intake port is discharged to an outside through the second discharge port after passing through the condenser,
some indoor air sucked through the indoor air intake port is discharged to the outside through the second discharge port after passing through the waste heat recovery heat exchanger and the condenser, and
remaining indoor air sucked through the indoor air intake port is supplied to the room through the air supply port after passing through the evaporator.

9. The air conditioner of claim 3, wherein
when the air conditioner operates in a summer cooling, dehumidification, and recirculation operation mode,
the first air volume control damper completely opens a space between the waste heat recovery heat exchanger and the casing in the first passage,
the second air volume control damper completely opens a space between the waste heat recovery heat exchanger and the casing in the second passage,
the air supply direction change damper blocks between the second passage and the air supply port, and
the indoor air intake direction change damper blocks between the second passage and the indoor air intake port,
so that outdoor air sucked through the second outdoor air intake port is discharged to an outside through the second discharge port after passing through the condenser, and
indoor air sucked through the indoor air intake port is supplied to a room through the air supply port after passing through the evaporator.

10. The air conditioner of claim 3, wherein
when the air conditioner operates in a winter heating, humidification, and full outdoor air ventilation operation mode,
the first air volume control damper blocks a space between the waste heat recovery heat exchanger and the casing in the first passage,
the second air volume control damper blocks a space between the waste heat recovery heat exchanger and the casing in the second passage,
the air supply direction change damper blocks between the first passage and the air supply port, and
the indoor air intake direction change damper blocks between the first passage and the indoor air intake port,
so that the outdoor air sucked through the first outdoor air intake port is supplied into a room through the air supply port after passing through the waste heat recovery heat exchanger and the condenser, and indoor air sucked through the indoor air intake port is discharged to an outside through the first discharge port after passing through the waste heat recovery heat exchanger and the evaporator.

11. The air conditioner of claim 3, wherein when the air conditioner operates in a winter heating, humidification, and partial outdoor air ventilation operation mode, the first air volume control damper partially opens a space between the waste heat recovery heat exchanger and the casing in the first passage, the second air volume control damper partially opens a space between the waste heat recovery heat exchanger and the casing in the second passage, the air supply direction change damper blocks between the first passage and the air supply port, and the indoor air intake direction change damper blocks between the first passage and the indoor air intake port, so that some outdoor air sucked through the first outdoor air intake port is supplied into a room through the air supply port after passing through the waste heat recovery heat exchanger and the condenser, remaining outdoor air sucked through the first outdoor air intake port is discharged to an outside through the first discharge port after passing through the evaporator, some indoor air sucked through the indoor air intake port is discharged to the outside through the first discharge port after passing through the waste heat recovery heat exchanger and the evaporator, and remaining indoor air sucked through the indoor air intake port is supplied to the room through the air supply port after passing through the condenser.

12. The air conditioner of claim 3, wherein when the air conditioner operates in a winter heating, humidification, and recirculation operation mode, the first air volume control damper completely opens a space between the waste heat recovery heat exchanger and the casing in the first passage, the second air volume control damper completely opens a space between the waste heat recovery heat exchanger and the casing in the second passage, the air supply direction change damper blocks between the first passage and the air supply port, and the indoor air intake direction change damper blocks between the first passage and the indoor air intake port, so that outdoor air sucked through the first outdoor air intake port is discharged to an outside through the first discharge port after passing through the evaporator, and indoor air sucked through the indoor air intake port is supplied to a room through the air supply port after passing through the condenser.

13. The air conditioner of claim 3, wherein when the air conditioner operates in a winter defrost operation mode, the first air volume control damper completely opens a space between the waste heat recovery heat exchanger and the casing in the first passage, the second air volume control damper completely opens a space between the waste heat recovery heat exchanger and the casing in the second passage, the air supply direction change damper blocks between the first passage and the air supply port, and the indoor air intake direction change damper blocks between the second passage and the indoor air intake port, so that outdoor air sucked through the second outdoor air intake port is moved to the second discharge port and the air supply port after passing through the condenser, and indoor air sucked through the indoor air intake port is moved to the first discharge port after passing through the evaporator.

14. The air conditioner of claim 2, wherein when the air conditioner operates in a changing season recirculation operation mode, the first air volume control damper completely opens a space between the waste heat recovery heat exchanger and the casing in the first passage, the second air volume control damper blocks a space between the waste heat recovery heat exchanger and the casing in the second passage, the air supply direction change damper blocks between the second passage and the air supply port, and the indoor air intake direction change damper blocks between the second passage and the indoor air intake port, so that indoor air sucked through the indoor air intake port is supplied to a room through the air supply port.

15. The air conditioner of claim 2, wherein when the air conditioner operates in a changing season ventilation operation mode, the first air volume control damper completely opens a space between the waste heat recovery heat exchanger and the casing in the first passage, the second air volume control damper completely opens a space between the waste heat recovery heat exchanger and the casing in the second passage, the air supply direction change damper blocks between the first passage and the air supply port, and the indoor air intake direction change damper blocks between the second passage and the indoor air intake port, so that outdoor air sucked through the second outdoor air intake port is supplied to a room through the air supply port, and indoor air sucked through the indoor air intake port is supplied to the room through the first discharge port.

16. The air conditioner of claim 7, further comprising:

a first discharge damper which blocks the first discharge port when the air supply direction change damper blocks between the second passage and the air supply port;

a second discharge damper which blocks the second discharge port when the air supply direction change damper blocks between the first passage and the air supply port;

a first intake damper which blocks the first outdoor air intake port when the indoor air intake direction change damper blocks between the second passage and the air supply port; and a second intake damper which blocks the second outdoor air intake port when the indoor air intake direction change damper blocks between the first passage and the air supply port.

17. The air conditioner of claim 2, further comprising:

a first heat exchanger disposed between the first discharge port and the air supply port, and the waste heat recovery heat exchanger in the first passage;

a second heat exchanger disposed between the second discharge port and the air supply port, and the waste heat recovery heat exchanger in the second passage;

a refrigerant flow path through which refrigerant flows between the first heat exchanger and the second heat exchanger;

an expansion valve installed in the refrigerant flow path;

a compressor installed in the refrigerant flow path to compress the refrigerant; and a four-way valve for switching intake and discharge paths of the compressor.

18. The air conditioner of claim 17, wherein when the air conditioner operates in a winter continuous heating operation mode, a first heating cycle in which the refrigerant discharged from the compressor flows through the four-way valve toward the second heat exchanger to allow the second heat exchanger and the first heat exchanger to respectively operate as a condenser and an evaporator, and the first air volume control damper, the second air volume control damper, and the direction change damper operate to allow indoor air sucked through the indoor air intake port to be heated through the second heat exchanger and to be supplied into a room through the air supply port, and a second heating cycle in which the refrigerant discharged from the compressor flows through the four-way valve toward the first exchanger to allow the first heat exchanger and the second heat exchanger to respectively operate as the condenser and the evaporator, and the first air volume control damper, the second air volume control damper, and the direction change damper operate to allow the indoor air sucked through the indoor air intake port to be heated through the first heat exchanger and to be supplied into the room through the air supply port, are alternately and repeatedly operated.

19. The air conditioner of claim 18, wherein the first heating cycle and the second heating cycle are alternately repeated according to a preset cycle, or alternately repeated according to a freezing state of the first heat exchanger or the second heat exchanger.

20. The air conditioner of claim 18, further comprising:

a first condensed water collection fan for collecting condensed water generated in the first heat exchanger;

a second condensed water collection fan for collecting condensed water generated in the second heat exchanger;

a first condensed water spraying unit for spraying the condensed water collected in the second condensed water collecting fan to the first heat exchanger;

a second condensed water spraying unit for spraying the condensed water collected in the first condensed water collecting fan to the second heat exchanger;

a first condensed water pump for supplying the condensed water collected in the first condensed water collecting fan to the second condensed water spraying unit; and a second condensed water pump for supplying the condensed water collected in the second condensed water collecting fan to the first condensed water spraying unit.

21. The air conditioner of claim 20, wherein in the first heating cycle, the second condensate pump is operated to spray condensed water the first heat exchanger to be frozen on the first heat exchanger, and the condensed water frozen on the second heat exchanger is vaporized and supplied into the room together with the indoor air to increase humidity in the room, and in the second heating cycle, the first condensate pump is operated to spray condensed water to the second heat exchanger to be frozen on the second heat exchanger, and the condensed water frozen on the first heat exchanger is vaporized and supplied into the room together with the indoor air to increase humidity in the room.

* * * * *